(12) United States Patent
Choi et al.

(10) Patent No.: US 7,414,371 B1
(45) Date of Patent: Aug. 19, 2008

(54) VOLTAGE REGULATION LOOP WITH VARIABLE GAIN CONTROL FOR INVERTER CIRCUIT

(75) Inventors: Hwangsoo Choi, Fullerton, CA (US); Chii-Fa Chiou, Lake Forest, CA (US)

(73) Assignee: Microsemi Corporation, Irvine, CA (US)

( * ) Notice: Subject to any disclaimer, the term of this patent is extended or adjusted under 35 U.S.C. 154(b) by 0 days.

(21) Appl. No.: 11/600,002

(22) Filed: Nov. 15, 2006

Related U.S. Application Data

(60) Provisional application No. 60/739,083, filed on Nov. 21, 2005.

(51) Int. Cl.
*G05F 1/00* (2006.01)
*H05B 37/02* (2006.01)
(52) U.S. Cl. ...................... 315/291; 315/307
(58) Field of Classification Search .............. 315/291, 315/307, 224–226, 311, DIG. 2, DIG. 4, 315/DIG. 5
See application file for complete search history.

(56) References Cited

U.S. PATENT DOCUMENTS

| | | | |
|---|---|---|---|
| 2,429,162 A | 10/1947 | Russell et al. | |
| 2,440,984 A | 5/1948 | Summers | |
| 2,572,258 A | 10/1951 | Goldfield et al. | |
| 2,965,799 A | 12/1960 | Brooks et al. | |
| 2,968,028 A | 1/1961 | Eilichi et al. | |
| 3,141,112 A | 7/1964 | Eppert | |
| 3,449,629 A | 6/1969 | Wigert et al. | |
| 3,565,806 A | 2/1971 | Ross | |
| 3,597,656 A | 8/1971 | Douglas | |
| 3,611,021 A | 10/1971 | Wallace | |
| 3,683,923 A | 8/1972 | Anderson | |
| 3,737,755 A | 6/1973 | Calkin et al. | |
| 3,742,330 A | 6/1973 | Hodges et al. | |
| 3,916,283 A | 10/1975 | Burrows | |
| 3,936,696 A | 2/1976 | Gray | |
| 3,944,888 A | 3/1976 | Clark | |
| 4,053,813 A | 10/1977 | Komrumpf et al. | |

(Continued)

FOREIGN PATENT DOCUMENTS

EP          0326114          8/1989

(Continued)

OTHER PUBLICATIONS

Jordan et al., Resonant Fluorescent Lamp Converter Provides Efficient and Compact Solution, Mar. 1993, pp. 424-431.

(Continued)

*Primary Examiner*—Douglas W. Owens
*Assistant Examiner*—Minh Dieu A
(74) *Attorney, Agent, or Firm*—Knobbe, Martens, Olson & Bear LLP

(57) ABSTRACT

A controller for an inverter provides variable gain control in a voltage regulation loop to prevent overshoot in an output voltage of the inverter. A feedback circuit senses the output voltage and provides a voltage feedback signal to the controller. The controller includes a voltage conversion circuit and an error amplifier as part of the voltage regulation loop. A gain control block varies a circuit parameter in the voltage conversion circuit or the error amplifier such that regulation of the output voltage starts at a relatively lower voltage level and increases smoothly to a desired level.

20 Claims, 11 Drawing Sheets

U.S. PATENT DOCUMENTS

| | | | |
|---|---|---|---|
| 4,060,751 A | 11/1977 | Anderson | |
| 4,204,141 A | 5/1980 | Nuver | |
| 4,277,728 A | 7/1981 | Stevens | |
| 4,307,441 A | 12/1981 | Bello | |
| 4,353,009 A | 10/1982 | Knoll | |
| 4,388,562 A | 6/1983 | Josephson | |
| 4,392,087 A | 7/1983 | Zansky | |
| 4,437,042 A | 3/1984 | Morais et al. | |
| 4,441,054 A | 4/1984 | Bay | |
| 4,463,287 A | 7/1984 | Pitel | |
| 4,469,988 A | 9/1984 | Cronin | |
| 4,480,201 A | 10/1984 | Jaeschke | |
| 4,523,130 A | 6/1985 | Pitel | |
| 4,543,522 A | 9/1985 | Moreau | |
| 4,544,863 A | 10/1985 | Hashimoto | |
| 4,555,673 A | 11/1985 | Huijsing et al. | |
| 4,562,338 A | 12/1985 | Okami | |
| 4,567,379 A | 1/1986 | Corey et al. | |
| 4,572,992 A | 2/1986 | Masaki | |
| 4,574,222 A | 3/1986 | Anderson | |
| 4,585,974 A | 4/1986 | Stupp et al. | |
| 4,622,496 A | 11/1986 | Dattilo et al. | |
| 4,626,770 A | 12/1986 | Price, Jr. | |
| 4,630,005 A | 12/1986 | Clegg et al. | |
| 4,663,566 A | 5/1987 | Nagano | |
| 4,663,570 A | 5/1987 | Luchaco et al. | |
| 4,672,300 A | 6/1987 | Harper | |
| 4,675,574 A | 6/1987 | Delflache | |
| 4,682,080 A | 7/1987 | Ogawa et al. | |
| 4,686,615 A | 8/1987 | Ferguson | |
| 4,689,802 A | 8/1987 | McCambridge | |
| 4,698,554 A | 10/1987 | Stupp et al. | |
| 4,700,113 A | 10/1987 | Stupp et al. | |
| 4,717,863 A | 1/1988 | Zeiler | |
| 4,745,339 A | 5/1988 | Izawa et al. | |
| 4,761,722 A | 8/1988 | Pruitt | |
| 4,766,353 A | 8/1988 | Burgess | |
| 4,779,037 A | 10/1988 | LoCascio | |
| 4,780,696 A | 10/1988 | Jirka | |
| 4,792,747 A | 12/1988 | Schroeder | |
| 4,812,781 A | 3/1989 | Regnier | |
| 4,847,745 A | 7/1989 | Shekhawat et al. | |
| 4,862,059 A | 8/1989 | Tominaga et al. | |
| 4,885,486 A | 12/1989 | Shekhawat et al. | |
| 4,893,069 A | 1/1990 | Harada et al. | |
| 4,902,942 A | 2/1990 | El-Hamamsy et al. | |
| 4,939,381 A | 7/1990 | Shibata | |
| 4,998,046 A | 3/1991 | Lester | |
| 5,023,519 A | 6/1991 | Jensen | |
| 5,030,887 A | 7/1991 | Guisinger | |
| 5,036,255 A | 7/1991 | McKnight | |
| 5,049,790 A | 9/1991 | Herfurth et al. | |
| 5,057,808 A | 10/1991 | Dhyanchand | |
| 5,083,065 A | 1/1992 | Sakata et al. | |
| 5,089,748 A | 2/1992 | Ihms | |
| 5,105,127 A | 4/1992 | Lavaud et al. | |
| 5,130,565 A | 7/1992 | Girmay | |
| 5,130,635 A | 7/1992 | Kase | |
| 5,173,643 A | 12/1992 | Sullivan et al. | |
| 5,220,272 A | 6/1993 | Nelson | |
| 5,235,254 A | 8/1993 | Ho | |
| 5,289,051 A | 2/1994 | Zitta | |
| 5,317,401 A | 5/1994 | Dupont et al. | |
| 5,327,028 A | 7/1994 | Yum et al. | |
| 5,349,272 A | 9/1994 | Rector | |
| 5,406,305 A | 4/1995 | Shimomura et al. | |
| 5,410,221 A | 4/1995 | Mattas et al. | |
| 5,420,779 A | 5/1995 | Payne | |
| 5,430,641 A | 7/1995 | Kates | |
| 5,434,477 A | 7/1995 | Crouse et al. | |
| 5,440,208 A | 8/1995 | Uskaly et al. | |
| 5,463,287 A | 10/1995 | Kurihara et al. | |
| 5,471,130 A | 11/1995 | Agiman | |
| 5,475,284 A | 12/1995 | Lester et al. | |
| 5,475,285 A | 12/1995 | Konopka | |
| 5,479,337 A | 12/1995 | Voigt | |
| 5,485,057 A | 1/1996 | Smallwood et al. | |
| 5,485,059 A | 1/1996 | Yamashita et al. | |
| 5,485,487 A | 1/1996 | Orbach et al. | |
| 5,493,183 A | 2/1996 | Kimball | |
| 5,495,405 A | 2/1996 | Fujimura et al. | |
| 5,510,974 A | 4/1996 | Gu et al. | |
| 5,514,947 A | 5/1996 | Berg | |
| 5,519,289 A | 5/1996 | Katyl et al. | |
| 5,528,192 A | 6/1996 | Agiman | |
| 5,539,281 A | 7/1996 | Shackle et al. | |
| 5,548,189 A | 8/1996 | Williams | |
| 5,552,697 A | 9/1996 | Chan | |
| 5,557,249 A | 9/1996 | Reynal | |
| 5,563,473 A | 10/1996 | Mattas et al. | |
| 5,563,501 A | 10/1996 | Chan | |
| 5,574,335 A | 11/1996 | Sun | |
| 5,574,356 A | 11/1996 | Parker | |
| 5,608,312 A | 3/1997 | Wallace | |
| 5,612,594 A | 3/1997 | Maheshwari | |
| 5,612,595 A | 3/1997 | Maheshwari | |
| 5,615,093 A | 3/1997 | Nalbant | |
| 5,619,104 A | 4/1997 | Eunghwa | |
| 5,619,402 A | 4/1997 | Liu | |
| 5,621,281 A | 4/1997 | Kawabata et al. | |
| 5,629,588 A | 5/1997 | Oda et al. | |
| 5,635,799 A | 6/1997 | Hesterman | |
| 5,652,479 A | 7/1997 | LoCascio et al. | |
| 5,663,613 A | 9/1997 | Yamashita et al. | |
| 5,705,877 A | 1/1998 | Shimada | |
| 5,710,489 A | 1/1998 | Nilssen | |
| 5,712,533 A | 1/1998 | Corti | |
| 5,712,776 A | 1/1998 | Palara et al. | |
| 5,719,474 A | 2/1998 | Vitello | |
| 5,744,915 A | 4/1998 | Nilssen | |
| 5,748,460 A | 5/1998 | Ishihawa | |
| 5,751,115 A | 5/1998 | Jayaraman et al. | |
| 5,751,120 A | 5/1998 | Zeitler et al. | |
| 5,751,560 A | 5/1998 | Yokoyama | |
| 5,754,012 A | 5/1998 | LoCascio et al. | |
| 5,754,013 A | 5/1998 | Praiswater | |
| 5,760,760 A | 6/1998 | Helms | |
| 5,770,925 A | 6/1998 | Konopka et al. | |
| 5,777,439 A | 7/1998 | Hua | |
| 5,786,801 A | 7/1998 | Ichise | |
| 5,796,213 A | 8/1998 | Kawasaki | |
| 5,808,422 A | 9/1998 | Venkitasubrahmanian et al. | |
| 5,818,172 A | 10/1998 | Lee | |
| 5,822,201 A | 10/1998 | Kijima | |
| 5,825,133 A | 10/1998 | Conway | |
| 5,828,156 A | 10/1998 | Roberts | |
| 5,844,540 A | 12/1998 | Terasaki | |
| 5,854,617 A | 12/1998 | Lee et al. | |
| 5,859,489 A | 1/1999 | Shimada | |
| 5,872,429 A | 2/1999 | Xia et al. | |
| 5,880,946 A | 3/1999 | Biegel | |
| 5,883,473 A | 3/1999 | Li et al. | |
| 5,886,477 A | 3/1999 | Honbo et al. | |
| 5,892,336 A | 4/1999 | Lin et al. | |
| 5,901,176 A | 5/1999 | Lewison | |
| 5,910,709 A | 6/1999 | Stevanovic et al. | |
| 5,910,713 A | 6/1999 | Nishi et al. | |
| 5,912,812 A | 6/1999 | Moriarty, Jr. et al. | |
| 5,914,842 A | 6/1999 | Sievers | |
| 5,923,129 A | 7/1999 | Henry | |
| 5,923,546 A | 7/1999 | Shimada et al. | |
| 5,925,988 A | 7/1999 | Grave et al. | |
| 5,930,121 A | 7/1999 | Henry | |
| 5,930,126 A | 7/1999 | Griffin et al. | |

| | | | | | | |
|---|---|---|---|---|---|---|
| 5,936,360 | A | 8/1999 | Kaneko | 6,441,943 | B1 | 8/2002 | Roberts et al. |
| 5,939,830 | A | 8/1999 | Praiswater | 6,445,141 | B1 | 9/2002 | Kastner et al. |
| 6,002,210 | A | 12/1999 | Nilssen | 6,452,344 | B1 | 9/2002 | MacAdam et al. |
| 6,011,360 | A | 1/2000 | Gradzki et al. | 6,459,215 | B1 | 10/2002 | Nerone et al. |
| 6,016,245 | A | 1/2000 | Ross | 6,459,216 | B1 | 10/2002 | Tsai |
| 6,020,688 | A | 2/2000 | Moisin | 6,469,922 | B2 | 10/2002 | Choi |
| 6,028,400 | A | 2/2000 | Pol et al. | 6,472,827 | B1 | 10/2002 | Nilssen |
| 6,037,720 | A | 3/2000 | Wong et al. | 6,472,876 | B1 | 10/2002 | Notohamiprodjo et al. |
| 6,038,149 | A | 3/2000 | Hiraoka et al. | 6,479,810 | B1 | 11/2002 | Weindorf |
| 6,040,662 | A | 3/2000 | Asayama | 6,483,245 | B1 | 11/2002 | Weindorf |
| 6,043,609 | A | 3/2000 | George et al. | 6,486,618 | B1 | 11/2002 | Li |
| 6,049,177 | A | 4/2000 | Felper | 6,494,587 | B1 | 12/2002 | Shaw et al. |
| 6,069,448 | A | 5/2000 | Yeh | 6,495,972 | B1 | 12/2002 | Okamoto et al. |
| 6,072,282 | A | 6/2000 | Adamson | 6,501,234 | B2 | 12/2002 | Lin et al. |
| 6,091,209 | A | 7/2000 | Hilgers | 6,507,286 | B2 | 1/2003 | Weindorf et al. |
| 6,104,146 | A | 8/2000 | Chou et al. | 6,509,696 | B2 | 1/2003 | Bruning et al. |
| 6,108,215 | A | 8/2000 | Kates et al. | 6,515,427 | B2 | 2/2003 | Oura et al. |
| 6,111,370 | A | 8/2000 | Parra | 6,515,881 | B2 | 2/2003 | Chou et al. |
| 6,114,814 | A | 9/2000 | Shannon et al. | 6,521,879 | B1 | 2/2003 | Rand et al. |
| 6,121,733 | A | 9/2000 | Nilssen | 6,522,558 | B2 | 2/2003 | Henry |
| 6,127,785 | A | 10/2000 | Williams | 6,531,831 | B2 | 3/2003 | Chou et al. |
| 6,127,786 | A | 10/2000 | Moison | 6,534,934 | B1 | 3/2003 | Lin et al. |
| 6,137,240 | A | 10/2000 | Bogdan | 6,559,606 | B1 | 5/2003 | Chou et al. |
| 6,150,772 | A | 11/2000 | Crane | 6,563,479 | B2 | 5/2003 | Weindorf et al. |
| 6,157,143 | A | 12/2000 | Bigio et al. | 6,570,344 | B2 | 5/2003 | Lin |
| 6,160,362 | A | 12/2000 | Shone et al. | 6,570,347 | B2 | 5/2003 | Kastner |
| 6,169,375 | B1 | 1/2001 | Moisin | 6,583,587 | B2 | 6/2003 | Ito et al. |
| 6,172,468 | B1 | 1/2001 | Hollander | 6,593,703 | B2 | 7/2003 | Sun |
| 6,181,066 | B1 | 1/2001 | Adamson | 6,628,093 | B2 | 9/2003 | Stevens |
| 6,181,083 | B1 | 1/2001 | Moisin | 6,630,797 | B2 | 10/2003 | Qian et al. |
| 6,181,084 | B1 | 1/2001 | Lau | 6,633,138 | B2 | 10/2003 | Shannon et al. |
| 6,188,553 | B1 | 1/2001 | Moisin | 6,642,674 | B2 | 11/2003 | Liao et al. |
| 6,188,183 | B1 | 2/2001 | Greenwood et al. | 6,650,514 | B2 | 11/2003 | Schmitt |
| 6,194,841 | B1 | 2/2001 | Takahashi et al. | 6,654,268 | B2 | 11/2003 | Choi |
| 6,198,234 | B1 | 3/2001 | Henry | 6,664,744 | B2 | 12/2003 | Dietz |
| 6,198,236 | B1 | 3/2001 | O'Neill | 6,680,834 | B2 | 1/2004 | Williams |
| 6,198,238 | B1 | 3/2001 | Edelson | 6,703,998 | B1 | 3/2004 | Kabel et al. |
| 6,211,625 | B1 | 4/2001 | Nilssen | 6,707,264 | B2 | 3/2004 | Lin et al. |
| 6,215,256 | B1 | 4/2001 | Ju | 6,710,555 | B1 | 3/2004 | Terada et al. |
| 6,218,788 | B1 | 4/2001 | Chen et al. | 6,864,867 | B2 | 3/2004 | Biebl |
| 6,229,271 | B1 | 5/2001 | Liu | 6,717,371 | B2 | 4/2004 | Klier et al. |
| 6,239,558 | B1 | 5/2001 | Fujimura et al. | 6,717,372 | B2 | 4/2004 | Lin et al. |
| 6,252,355 | B1 | 6/2001 | Meldrum et al. | 6,717,375 | B2 | 4/2004 | Noguchi et al. |
| 6,255,784 | B1 | 7/2001 | Weindorf | 6,724,602 | B2 | 4/2004 | Giannopoulos |
| 6,259,215 | B1 | 7/2001 | Roman | 6,765,354 | B2 | 7/2004 | Klein |
| 6,259,615 | B1 | 7/2001 | Lin | 6,781,325 | B2 | 8/2004 | Lee |
| 6,281,636 | B1 | 8/2001 | Okutsu et al. | 6,784,627 | B2 | 8/2004 | Suzuki et al. |
| 6,281,638 | B1 | 8/2001 | Moisin | 6,803,901 | B1 | 10/2004 | Numao |
| 6,291,946 | B1 | 9/2001 | Hinman | 6,804,129 | B2 | 10/2004 | Lin |
| 6,294,883 | B1 | 9/2001 | Weindorf | 6,809,718 | B2 | 10/2004 | Wei et al. |
| 6,307,765 | B1 | 10/2001 | Choi | 6,809,938 | B2 | 10/2004 | Lin et al. |
| 6,310,444 | B1 | 10/2001 | Chang | 6,816,142 | B2 | 11/2004 | Oda et al. |
| 6,313,586 | B1 | 11/2001 | Yamamoto et al. | 6,856,099 | B2 | 2/2005 | Chen et al. |
| 6,316,881 | B1 | 11/2001 | Shannon et al. | 6,856,519 | B2 | 2/2005 | Lin et al. |
| 6,316,887 | B1 | 11/2001 | Ribarich et al. | 6,870,330 | B2 | 3/2005 | Choi |
| 6,317,347 | B1 | 11/2001 | Weng | 6,876,157 | B2 | 4/2005 | Henry |
| 6,320,329 | B1 | 11/2001 | Wacyk | 6,897,698 | B1 | 5/2005 | Gheorghiu et al. |
| 6,323,602 | B1 | 11/2001 | De Groot et al. | 6,900,599 | B2 | 5/2005 | Ribarich |
| 6,331,755 | B1 | 12/2001 | Ribarich et al. | 6,900,600 | B2 | 5/2005 | Rust et al. |
| 6,340,870 | B1 | 1/2002 | Yamashita et al. | 6,900,993 | B2 | 5/2005 | Lin et al. |
| 6,344,699 | B1 | 2/2002 | Rimmer | 6,922,023 | B2 | 7/2005 | Hsu et al. |
| 6,351,080 | B1 | 2/2002 | Birk et al. | 6,930,893 | B2 | 8/2005 | Vinciarelli |
| 6,356,035 | B1 | 3/2002 | Weng | 6,936,975 | B2 * | 8/2005 | Lin et al. ................... 315/224 |
| 6,359,393 | B1 | 3/2002 | Brown | 6,947,024 | B2 | 9/2005 | Lee et al. |
| 6,362,577 | B1 | 3/2002 | Ito et al. | 6,967,449 | B2 * | 11/2005 | Ishihara et al. ............... 315/307 |
| 6,388,388 | B1 | 5/2002 | Weindorf et al. | 6,967,657 | B2 | 11/2005 | Lowles et al. |
| 6,396,217 | B1 | 5/2002 | Weindorf | 6,969,958 | B2 * | 11/2005 | Henry ........................ 315/291 |
| 6,396,722 | B2 | 5/2002 | Lin | 6,979,959 | B2 * | 12/2005 | Henry ........................ 315/291 |
| 6,417,631 | B1 | 7/2002 | Chen et al. | 7,026,860 | B1 | 4/2006 | Gheorghiu et al. |
| 6,420,839 | B1 | 7/2002 | Chiang et al. | 7,057,611 | B2 | 6/2006 | Lin et al. |
| 6,424,100 | B1 | 7/2002 | Kominami et al. | 7,075,245 | B2 | 7/2006 | Liu |
| 6,429,839 | B1 | 8/2002 | Sakamoto | 7,095,392 | B2 | 8/2006 | Lin |
| 6,433,492 | B1 | 8/2002 | Buonavita | 7,120,035 | B2 | 10/2006 | Lin et al. |

| | | |
|---|---|---|
| 7,151,394 B2 | 12/2006 | Gheorghiu et al. |
| 7,183,724 B2 | 2/2007 | Ball |
| 7,187,140 B2 | 3/2007 | Ball |
| 7,190,123 B2 | 3/2007 | Lee |
| 7,202,458 B2 | 4/2007 | Park |
| 7,233,117 B2 | 6/2007 | Wang et al. |
| 7,236,020 B1 | 6/2007 | Virgil |
| 2001/0036096 A1 | 11/2001 | Lin |
| 2002/0030451 A1 | 3/2002 | Moisin |
| 2002/0097004 A1 | 7/2002 | Chiang et al. |
| 2002/0114114 A1* | 8/2002 | Schmitt ............... 361/18 |
| 2002/0118182 A1 | 8/2002 | Weindorf |
| 2002/0130786 A1 | 9/2002 | Weindorf |
| 2002/0135319 A1 | 9/2002 | Bruning et al. |
| 2002/0140538 A1 | 10/2002 | Yer |
| 2002/0145886 A1 | 10/2002 | Stevens |
| 2002/0153852 A1 | 10/2002 | Liao et al. |
| 2002/0171376 A1 | 11/2002 | Rust et al. |
| 2002/0180380 A1 | 12/2002 | Lin |
| 2002/0180572 A1 | 12/2002 | Kakehashi et al. |
| 2002/0181260 A1 | 12/2002 | Chou et al. |
| 2002/0195971 A1 | 12/2002 | Qian et al. |
| 2003/0001524 A1 | 1/2003 | Lin et al. |
| 2003/0020677 A1* | 1/2003 | Nakano ............... 345/87 |
| 2003/0025462 A1 | 2/2003 | Weindorf |
| 2003/0080695 A1 | 5/2003 | Ohsawa |
| 2003/0090913 A1 | 5/2003 | Che-Chen et al. |
| 2003/0117084 A1 | 6/2003 | Stack |
| 2003/0141829 A1 | 7/2003 | Yu |
| 2003/0161164 A1 | 8/2003 | Shannon et al. |
| 2003/0227435 A1 | 12/2003 | Hsieh |
| 2004/0000879 A1 | 1/2004 | Tai |
| 2004/0012556 A1 | 1/2004 | Yong et al. |
| 2004/0017348 A1 | 1/2004 | Numao |
| 2004/0032223 A1 | 2/2004 | Henry |
| 2004/0051473 A1 | 3/2004 | Jales et al. |
| 2004/0145558 A1 | 7/2004 | Cheng |
| 2004/0155596 A1 | 8/2004 | Ushijima |
| 2004/0155853 A1 | 8/2004 | Lin |
| 2004/0189217 A1 | 9/2004 | Ishihara et al. |
| 2004/0257003 A1 | 12/2004 | Hsieh et al. |
| 2004/0263092 A1 | 12/2004 | Liu |
| 2005/0062436 A1 | 3/2005 | Jin |
| 2005/0093471 A1 | 5/2005 | Jin |
| 2005/0093472 A1 | 5/2005 | Jin |
| 2005/0093482 A1 | 5/2005 | Ball |
| 2005/0093483 A1 | 5/2005 | Ball |
| 2005/0093484 A1 | 5/2005 | Ball |
| 2005/0094372 A1 | 5/2005 | Jin |
| 2005/0099143 A1 | 5/2005 | Kohno |
| 2005/0153536 A1 | 7/2005 | Ball |
| 2005/0156539 A1 | 7/2005 | Ball |
| 2005/0156540 A1 | 7/2005 | Ball |
| 2005/0162098 A1 | 7/2005 | Ball |
| 2005/0218825 A1 | 10/2005 | Chiou |
| 2005/0225261 A1 | 10/2005 | Jin |
| 2006/0022612 A1 | 2/2006 | Henry |
| 2006/0049959 A1 | 3/2006 | Sanchez |

FOREIGN PATENT DOCUMENTS

| | | |
|---|---|---|
| EP | 0587923 | 3/1994 |
| EP | 0597661 | 5/1994 |
| EP | 0647021 | 9/1994 |
| JP | 06168791 | 6/1994 |
| JP | 8-204488 | 8/1996 |
| KR | 10-2003-0075461 | 10/2003 |
| TW | 554643 | 9/2003 |
| TW | 8-204488 | 12/2003 |
| TW | 200501829 | 1/2005 |
| WO | WO 94/15444 | 7/1994 |
| WO | WO 98/09369 | 3/1998 |

OTHER PUBLICATIONS

Unitrode Datasheet, Resonant Fluorescent Lamp Driver, UC 1871/2871/3871, May 1993, pp. 1-6.
Unitrode Product & Applications Handbook 1993-94, U-141, Jun. 1993, pp. i-ii; 9-471-9-478.
Williams, Jim, Techniques for 92% Efficient LCD Illumination, Linear Technology Application Note 55, Aug. 1993.
Unitrode Datasheet, Resonant Fluorescent Lamp Driver, UC 1871/2871/3871, Oct. 1994, pp. 1-6.
O'Connor, J., Dimmable Cold-Cathode Fluorescent Lamp Ballast Design Using the UC3871, Application Note U-148, pp. 1-15, 1995.
Goodenough, Frank, DC-to-AC Inverter Ups CCFL Lumens Per Watt, Electronic Design, Jul. 10, 1995, pp. 143-148.
Coles, Single Stage CCFL Backlight Resonant Inverter using PWM Dimming Methods, 1998, pp. 35-38.
Micro Linear, ML4878 Single-Stage CCFL Backlight Resonant Inverter, Application Note 68, May 1998, pp. 1-12.
Williams, B.W.; "Power Electronics Devices, Drivers, Applications and Passive Components"; Second Edition, McGraw-Hill, 1992; Chapter 10, pp. 218-249.
Bradley, D.A., "Power Electronics" 2nd Edition; Chapman & Hall, 1995; Chapter 1, pp. 1-38.
Dubey, G. K., "Thyristorised Power Controllers"; Halsted Press, 1986; pp. 74-77.
IEEE Publication, "Dual Switched Mode Power Converter": Pallab Midya & Fred H. Schlereth; p. 155 1989.
IEEE Publication, "High Frequency Resonant Inverter For Group Dimming Control of Fluorescent Lamp Lighting Systems", K.H. Jee, et al., 1989 149-154.
Int. J. Electronics, "New soft-switching inverter for high efficiency electronic ballast with simple structure" E.C. Nho, et al., 1991, vol. 71, No. 3, 529-541.
Nguyen, Don J., "Optimizing Mobile Power Delivery". Presented at Intel Developers Forum, Fall 2001, p. 4.
Plaintiff O2 Micro International Limited's Preliminary Invalidity Contentions re Third-Party Defendant Microsemi Corporation Patents, dated Sep. 14, 2007.
Third-Party Defendant Microsemi Corporation's Brief in Support of its Claim Construction for U.S. Patent Nos. 5,930,121 and 6,198,234, dated Oct. 19, 2007.
Declaration of Irfan A. Lateef in Support of Third-Party Defendant Microsemi Corporation's Brief in Support of its Claim Construction for U.S. Patent Nos. 5,930,121 and 6,198,234, dated Oct. 19, 2007.
Plaintiff O2 Micro International Limited's Brief in Response to Third-Party Defendant Microsemi Corporation's Brief Re Claim Construction for U.S. Patent Nos. 5,930,121 and 6,198,234, dated Oct. 26, 2007.
Declaration of Henry C. Su in Support of Plaintiff 02 Micro International Limited's Brief in Response to Third-Party Defendant Microsemi Corporation's Brief Re Claim Construction for U.S. Patent Nos. 5,930,121 and 6,198,234, dated Oct. 26, 2007.
Defendant/Counterclaimant Monolithic Power Systems, Inc.'s Notice of Motion and Motion for Summary Judgment of Invalidity of Asserted Claims of U. S. Patent No. 6,198,234, dated Nov. 14, 2005.
Defendant/Counterclaimant Monolithic Power Systems, Inc.'s Memorandum of Points and Authorities in Support of Motion for Summary Judgment of Invalidity of Asserted Claims of U. S. Patent No. 6,198,234, dated Nov. 14, 2005.
Declaration of Robert Mammano filed by Defendant/Counterclaimant Monolithic Power Systems, Inc.'s In Support of Its Motion for Summary Judgment of Invalidity of Asserted Claims of U. S. Patent No. 6,198,234, dated Nov. 14, 2005.
Declaration of John A. O'Connor filed by Defendant/Counterclaimant Monolithic Power Systems, Inc.'s on Support of Its Motion for Summary Judgment of Invalidity of Asserted Claims of U. S. Patent No. 6,198,234, dated Nov. 14, 2005.
Declaration of Defendant/Counterclaimant Monolithic Power Systems, Inc.'s Expert Witness, Dr. Douglas C. Hopkins, In Support of Its Motion for Summary Judgment of Invalidity of Asserted Claims of U. S. Patent No. 6,198,234, dated Nov. 14, 2005.

Declaration of Doyle Slack filed by Defendant/Counterclaimant Monolithic Power Systems, Inc.'s In Support of Its Motion for Summary Judgment of Invalidity of Asserted Claims of U. S. Patent No. 6,198,234, dated Nov. 14, 2005.

Declaration of Dean G. Dunlavey filed by Defendant/Counterclaimant Monolithic Power Systems, Inc.'s In Support of Its Motion for Summary Judgment of Invalidity of Asserted Claims of U. S. Patent No. 6,198,234, dated Nov. 14, 2005.

Declaration of Charles Coles filed by Defendant/Counterclaimant Monolithic Power Systems, Inc.'s In Support of Its Motion for Summary Judgment of Invalidity of Asserted Claims of U. S. Patent No. 6, 198,234, dated Nov. 14, 2005.

Plaintiff Microsemi Corporation's Opposition to Defendant/Counterclaimant Monolithic Power Systems, Inc.'s Motion for Summary Judgment of Invalidity of Asserted Claims of U.S. Patent No. 6,198,234, dated Feb. 13, 2006.

Plaintiff Microsemi Corporation's Statement of Genuine Issues in Opposition to Defendant/Counterclaimant Monolithic Power Systems, Inc.'s Motion for Summary Judgment of Invalidity of Asserted Claims of U.S. Patent No. 6,198,234, dated Feb. 13, 2006.

Defendant/Counterclaimant Monolithic Power Systems, Inc.'s Reply Brief in Support of Motion for Summary Judgment of Invalidity of Asserted Claims of U. S. Patent No. 6,198,234, dated Mar. 13, 2006.

Supplemental Declaration of Dean G. Dunlavey filed by Defendant/Counterclaimant Monolithic Power Systems, Inc.'s In Support of Its Motion for Summary Judgment of Invalidity of Asserted Claims of U. S. Patent No. 6,198,234, dated Mar. 13, 2006.

Defendant/Counterclaimant Monolithic Power Systems, Inc.'s Notice of Motion and Motion for Summary Judgment of Invalidity of Asserted Claims of U. S. Patent No. 5,615,093, dated Nov. 14, 2005.

Defendant/Counterclaimant Monolithic Power Systems, Inc.'s Memorandum of Points and Authorities in Support of Motion for Summary Judgment of Invalidity of Asserted Claims of U. S. Patent No. 5,615,093, dated Nov. 14, 2005.

Plaintiff Microsemi Corporation's Opposition to Defendant/Counterclaimant Monolithic Power Systems, Inc.'s Motion for Summary Judgment of Invalidity of Asserted Claims of U.S. Patent No. 5,615,093, dated Feb. 13, 2006.

Plaintiff Microsemi Corporation's Statement of Genuine Issues in Opposition to Defendant/Counterclaimant Monolithic Power Systems, Inc.'s Motion for Summary Judgement of Invalidity of Asserted Claims of U.S. Patent No. 5,615,,093, dated Feb. 13, 2006.

Defendant/Counterclaimant Monolithic Power Systems, Inc.'s Reply Brief in Support of Motion for Summary Judgment of Invalidity of Asserted Claims of U. S. Patent No. 5,615,093, dated Mar. 13, 2006.

* cited by examiner

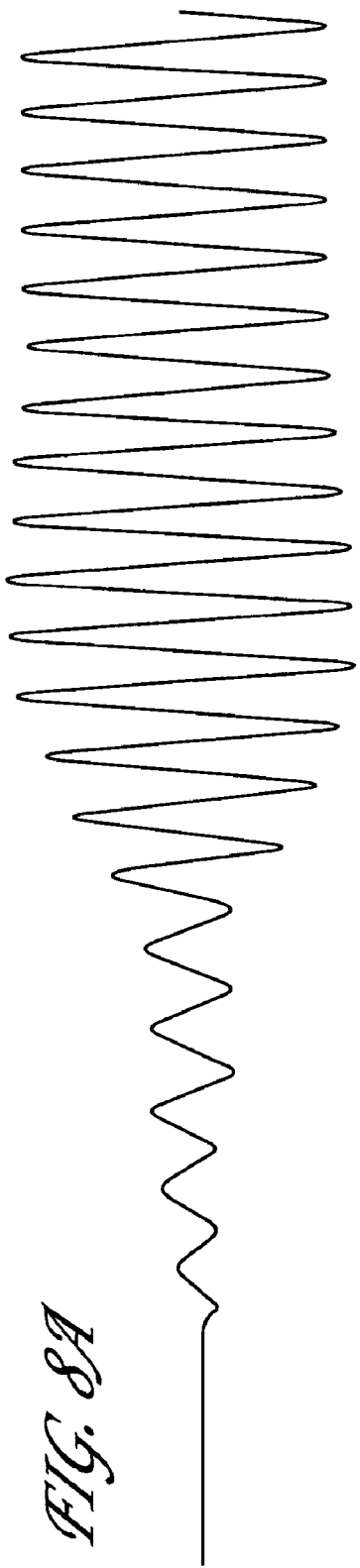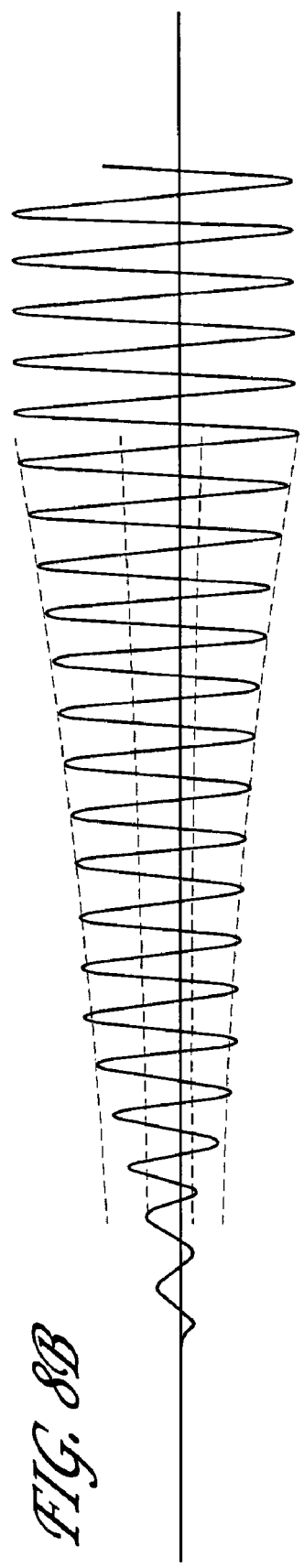
FIG. 8A
FIG. 8B

VOLTAGE REGULATION LOOP WITH VARIABLE GAIN CONTROL FOR INVERTER CIRCUIT

CLAIM FOR PRIORITY

This application claims the benefit of priority under 35 U.S.C. § 119(e) of U.S. Provisional Application No. 60/739,083, filed on Nov. 21, 2005, and entitled "Voltage Overshoot Prevention Circuit For Inverter," the entirety of which is incorporated herein by reference.

BACKGROUND

1. Field of the Invention

The invention generally relates to a pulse width modulation (PWM) controller for an inverter, and more particularly, relates to a PWM controller that provides variable gain control in a voltage regulation loop to regulate an output voltage of the inverter.

2. Description of the Related Art

An inverter (or DC-to-AC conversion circuit) is typically used to drive a fluorescent lamp. The inverter can vary its frequency or PWM duty cycle to generate an increasing output voltage (or open lamp output voltage) with a sufficient voltage level to strike an unlit fluorescent lamp. The output voltage is sensed to generate a feedback voltage for a voltage regulation loop of the inverter. The inverter generally starts to regulate the output voltage when the feedback voltage reaches the level of an internal reference voltage corresponding to a desired level for the regulated output voltage. The output voltage can easily overshoot before reaching a stable regulation point due to feedback delay.

SUMMARY

The present invention solves these and other problems by providing variable gain control in a voltage regulation loop of an inverter. In one embodiment, overshoot in an output voltage of the inverter is prevented by adjusting the gain of the voltage regulation loop to start output voltage regulation at a relatively lower voltage level and to thereafter increase the regulated output voltage to a relatively higher (or desired) voltage level. For example, the voltage regulation loop is set for a higher (e.g., maximum) gain at start-up or after reset to activate voltage regulation at a relatively lower output voltage level. The gain then decreases over time or at a predetermined rate to increase the regulated output voltage smoothly from the relatively lower output voltage level to a relatively higher output voltage level associated with steady-state operations (e.g., a maximum regulated output voltage).

In one embodiment, an inverter is configured for driving at least one fluorescent lamp (e.g., a cold cathode fluorescent lamp). The inverter accepts a DC input voltage and produces an AC output voltage to drive the fluorescent lamp. The inverter includes a controller, a switching network (e.g., a full-bridge, half-bridge or push-pull switching network) and a transformer. The controller outputs PWM driving signals to the switching network to generate an AC waveform on a primary winding of the transformer. A corresponding AC signal (or output voltage of the inverter) is produced across a secondary winding of the transformer, and the secondary winding is coupled across the fluorescent lamp (or lamp load comprising a plurality of lamps). The fluorescent lamp can be used for backlighting or edge lighting liquid crystal displays (LCDs) in a variety of applications, including but not limited to notebook computers, web browsers, automotive and industrial instrumentations and entertainment systems.

In one embodiment, a voltage feedback circuit (e.g., a capacitor voltage divider) is coupled to the output voltage of the inverter to generate a feedback signal. The feedback signal is provided to an input terminal of the controller. In one configuration, the controller includes a voltage regulation loop comprising a voltage conversion circuit and an error amplifier. The feedback signal is provided to an input of the voltage conversion circuit and an output of the voltage conversion circuit is provided to an input of the error amplifier. The controller further includes a pulse width modulator that generates a driving control signal to control the output voltage of the inverter based on an output of the error amplifier. For example, the pulse width modulator compares the output of the error amplifier with a ramp signal to generate the driving control signal which is then used to determine the pulse widths of the PWM driving signals provided by the controller to control the switching network.

In one embodiment, the controller further includes a gain control block that varies at least one circuit parameter (e.g., a threshold voltage or an impedance) in the voltage conversion circuit or in the error amplifier to adjust a gain of the voltage regulation loop in response to a clock signal. For example, the gain of the voltage regulation loop is set at start-up or after reset to an initial level associated with a relatively lower regulated output voltage for the inverter and progresses (e.g., decreases) to a final value associated with a relatively higher regulated output voltage after a predetermined number of cycles in the clock signal. In some fluorescent lamp applications, the relatively higher regulated output voltage corresponds to a maximum open lamp output voltage used to strike an unlit fluorescent lamp.

In one embodiment, the voltage conversion circuit comprises an operational amplifier with the feedback signal coupled to an inverting input terminal, a first threshold voltage coupled to a non-inverting input terminal, and a feedback impedance coupled between the inverting input terminal and an output terminal of the operational amplifier. In some configurations, the first threshold voltage or the feedback impedance can vary to adjust the gain of the voltage conversion circuit, thereby adjusting the gain of the voltage regulation loop. In another embodiment, the voltage conversion circuit comprises a level-shift circuit with an impedance that can vary to adjust the gain of the voltage regulation loop. In yet another embodiment, the voltage conversion circuit comprises a rectifier circuit that provides full-wave or half-wave rectification of the feedback signal with at least one variable circuit element to adjust the gain of the voltage regulation loop. In one embodiment, the error amplifier comprises at least one comparator that compares the output of the voltage conversion circuit to a second threshold voltage that is variable to adjust the gain of the voltage regulation loop.

In one embodiment, the controller further comprises a clock generator coupled to the output of the voltage conversion circuit to generate the clock signal for the gain control block. Thus, the clock signal can be based on the feedback signal. For example, the clock generator comprises at least one comparator that compares the output of the voltage conversion circuit to a third threshold voltage to generate the clock signal. In one embodiment, the gain control block comprises a counter that counts with each cycle of the clock signal and a digital-to-analog converter (DAC) that generates a gain control signal to adjust the gain of the voltage regulation loop based on an output of the counter. In some configurations, the gain control block further comprises a register coupled between the counter and the DAC.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

These drawings and the associated description herein are provided to illustrate embodiments and are not intended to be limiting.

FIG. 8A illustrates an inverter output voltage waveform with overshoot.

FIG. 8B illustrates an inverter output voltage waveform without overshoot.

DETAILED DESCRIPTION OF EMBODIMENTS

Embodiments of the present invention will be described hereinafter with reference to the drawings. Although particular embodiments are described herein, other embodiments, including embodiments that do not provide all of the benefits and features set forth herein, will be apparent to those of ordinary skill in the art.

Figure 1:
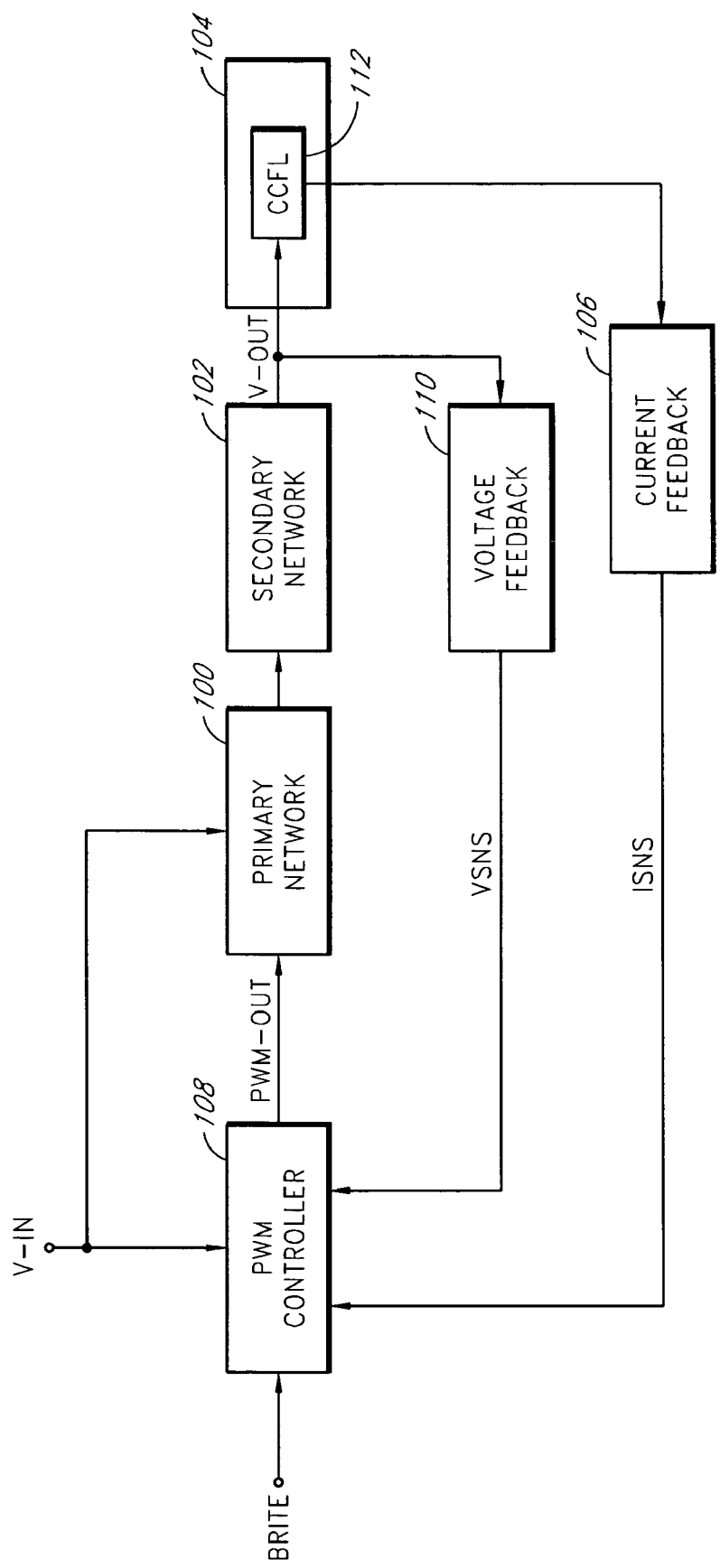
FIG. 1 is a block diagram of one embodiment of an inverter.

FIG. 1 is a block diagram of a power conversion circuit (or inverter) according to one embodiment of the present invention. The inverter converts a substantially DC input voltage (V-IN) into a substantially AC output voltage (V-OUT) to drive at least one cold cathode fluorescent lamp (CCFL) 112. An AC current (or lamp current) flows through the CCFL 112 to provide illumination in an electronic device 104, such as, for example, a flat panel display, a personal digital assistant, a palm top computer, a scanner, a facsimile machine, a copier, or the like.

The inverter includes a PWM controller 108, a primary network 100, a secondary network 102, a current feedback circuit 106 and a voltage feedback circuit 110. The input voltage (or supply voltage) is provided to the primary network 100 and the PWM controller 108. The primary network 100 is controlled by PWM driving signals (PWM-OUT) provided by the PWM controller 108. The secondary network 102 is coupled to the primary network 100 and produces the output voltage to drive the CCFL 112. The current feedback circuit 106 is coupled to the CCFL 112 and generates a current feedback signal (ISNS) indicative of the lamp current level. The voltage feedback circuit 110 is coupled to the output of the secondary network 102 and generates a voltage feedback signal (VSNS) indicative of the output voltage level. The current feedback signal and the voltage feedback signal along with at least one brightness control signal (BRITE) are provided to the PWM controller 108 to regulate power provided to the CCFL 112. In one embodiment, the PWM controller 108 is an integrated circuit chip. In some applications, the PWM controller 108 includes one or more integrated full-wave or half-wave rectifiers to process or condition the feedback signals provided by the current feedback circuit 106 and the voltage feedback circuit 110.

In one embodiment, the PWM controller 108 includes part of a voltage regulation loop that monitors the voltage feedback signal to regulate the output voltage level during a strike mode. For example, the PWM controller 108 enters the strike mode to ignite an unlit CCFL 112 upon power up or receiving an enable signal. The PWM controller 108 varies the frequency or the duty cycle of the driving signals to generate a sufficiently high starting voltage (or open lamp voltage) to ignite the CCFL 112. To avoid damaging circuit components and dangerous conditions, the PWM controller 108 regulates the open lamp voltage to a predetermined or maximum level (e.g., approximately 2,000 volts). To prevent the open lamp voltage from overshooting the maximum level, the PWM controller 108 advantageously provides variable gain control in the voltage regulation loop such that regulation of the open lamp voltage begins at a relatively lower level (e.g., approximately 1,000 volts) and gradually increases to the maximum level by adjusting the gain of the voltage regulation loop.

The PWM controller 108 monitors the current feedback signal to determine when the CCFL 112 ignites (e.g., when the CCFL 112 conducts sufficient current). After ignition, the PWM controller 108 enters a run mode and monitors the current feedback signal to control the brightness of the CCFL 112 in accordance with the brightness control signal (BRITE). In one embodiment, the frequency of the PWM driving signals is predetermined (or fixed) and the current feedback signal controls the duty cycle of the PWM driving signals to provide the desired brightness in the run mode.

Figure 2:
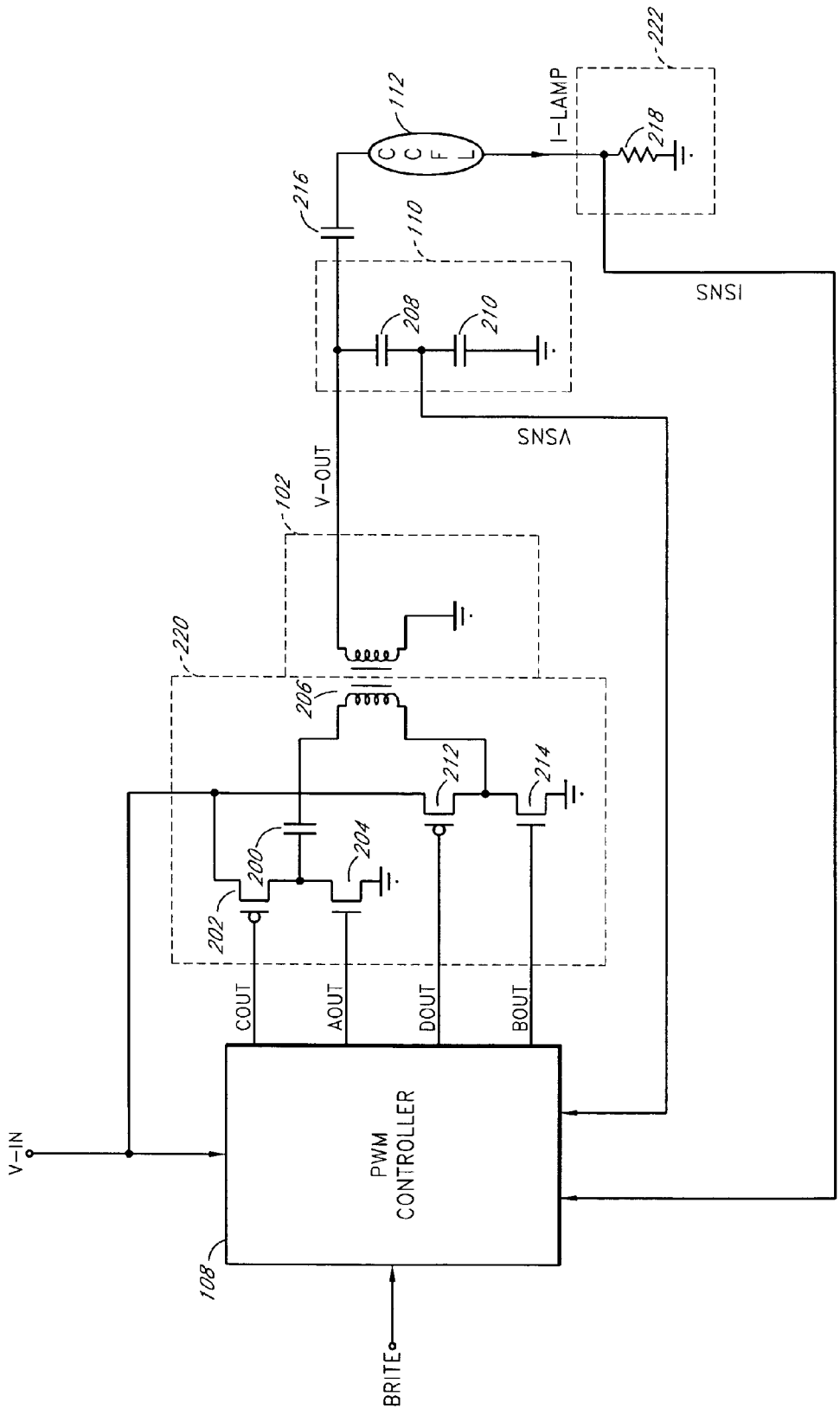
FIG. 2 illustrates one embodiment of an inverter with a full-bridge switching network and a first configuration for sensing a load current.

FIG. 2 illustrates one embodiment of an inverter with a full-bridge switching network and a first configuration for sensing a load current. A primary network 220 includes four switching transistors (or semiconductor switches) 202, 204, 212, 214 in a full-bridge configuration, a primary winding of a transformer 206 and an optional AC-coupling (or DC-blocking) capacitor 200. In one embodiment, the switching transistors 202, 212 are p-type field effect transistors (P-FETs) with source terminals coupled to the input voltage and drain terminals coupled to respective opposite terminals of the primary winding of the transformer 206. The drain terminals of the switching transistors 202, 212 are also coupled to respective drain terminals of the switching transistors 204, 214 which are N-FETs. The source terminals of the switching transistors 204, 214 are coupled to ground. The switching transistors 204, 214, 202, 212 are controlled by respective PWM driving signals from the PWM controller 108. The PWM driving signals, labeled as AOUT, BOUT, COUT and DOUT, are coupled to respective gate terminals of the switching transistors 204, 214, 202, 212.

The PWM driving signals from the PWM controller 108 cause the switching transistors 202, 204, 212, 214 to alternately conduct to generate an AC signal (or transformer drive signal) on the primary winding of the transformer 206. The AC signal is magnetically coupled to a secondary winding of the transformer 206 in the secondary network 102. In one embodiment, a first terminal of the secondary winding of the transformer 206 is coupled to ground while a second terminal of the secondary winding is coupled to a first terminal of the CCFL 112. In some configurations, a DC-blocking capacitor 216 is inserted between the secondary winding of the transformer 206 and the CCFL 112.

In one embodiment, the voltage feedback circuit 110 is a capacitor divider coupled between the output of the secondary network 102 and ground. For example, a first capacitor 208 is coupled between the second terminal of the secondary winding of the transformer 206 and a first node. A second capacitor 210 is coupled between the first node and ground. A voltage across the second capacitor 210 is proportional to the output voltage of the inverter and is provided as a voltage feedback signal or sensed voltage (VSNS) to the PWM controller 108 to indicate the output voltage level.

In FIG. 2, a current feedback circuit 222 comprises a sense resistor 218 coupled in series with the CCFL 112 to sense the load current (or lamp current). For example, the sense resistor 218 is coupled between a second terminal of the CCFL 112 and ground. The lamp current (I-LAMP) flowing through the CCFL 112 also flows through the sense resistor 218. A voltage across the sense resistor 218 is provided as a current feedback signal or sense current (ISNS) to the PWM controller 108 to indicate the lamp current level. Alternately, the current feedback circuit 222 can be coupled to the secondary network 102 to generate the current feedback signal indicative of the operating conditions of the CCFL 112. For example, the sense resistor 218 can be inserted between the first terminal of the secondary winding of the transformer 206 and ground to generate the current feedback signal indicative of the lamp current level.

Figure 3A:
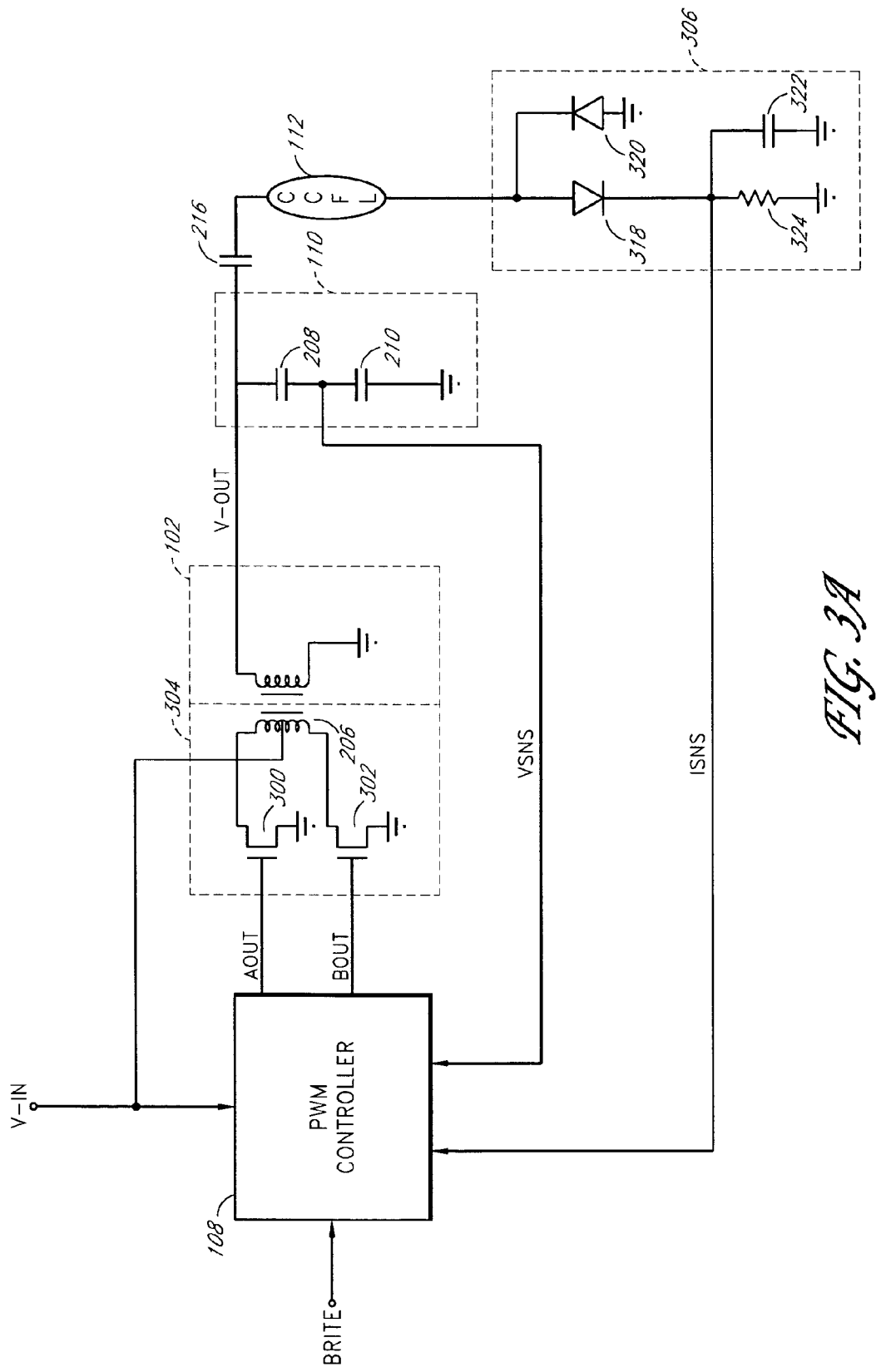
FIG. 3A illustrates one embodiment of an inverter with a push-pull switching network and a second configuration for sensing a load current.

FIG. 3A illustrates one embodiment of an inverter with a push-pull switching network and a second configuration for sensing a load current. For example, a primary network 304 includes two switching transistors 300, 302 in a push-pull configuration and a primary winding of a transformer 206. In one embodiment, the switching transistors 300, 302 are N-FETs with respective drain terminals coupled to opposite ends of the primary winding of the transformer 206. The source terminals of the switching transistors 300, 302 are coupled to ground and a supply voltage (V-IN) is provided to a center-tap of the primary winding of the transformer 206. The switching transistors 300, 302 are controlled by respective PWM driving signals (AOUT, BOUT) to alternately conduct and generate an AC signal on the primary winding. The PWM driving signals are provided by the PWM controller 108 to respective gate terminals of the switching transistors 300, 302.

In FIG. 3A, a current feedback circuit 306 comprises a half-wave rectifier coupled in series with the CCFL 112 to sense the load current (or lamp current). For example, the current feedback circuit 306 includes diodes 318, 320, a sense resistor 324 and a capacitor 322. The CCFL 112 is coupled to an anode of the diode 318 and a cathode of the diode 320. An anode of the diode 320 is coupled to ground. A cathode of the diode 318 is coupled to a first terminal of the sense resistor 324. A second terminal of the sense resistor 324 is coupled to ground and the capacitor 322 is coupled in parallel with the sense resistor 324. The voltage across the sense resistor 324 is provided as a current feedback signal to the PWM controller 108. The diode 318 operates as a half-wave rectifier such that the voltage across the sense resistor 324 is responsive to the lamp current passing through the CCFL 112 in one direction. The diode 320 provides a current path for alternate half-cycles when the lamp current flows in another direction. The capacitor 322 provides filtering such that the current feedback signal indicates an average level of the lamp current.

Figure 3B:
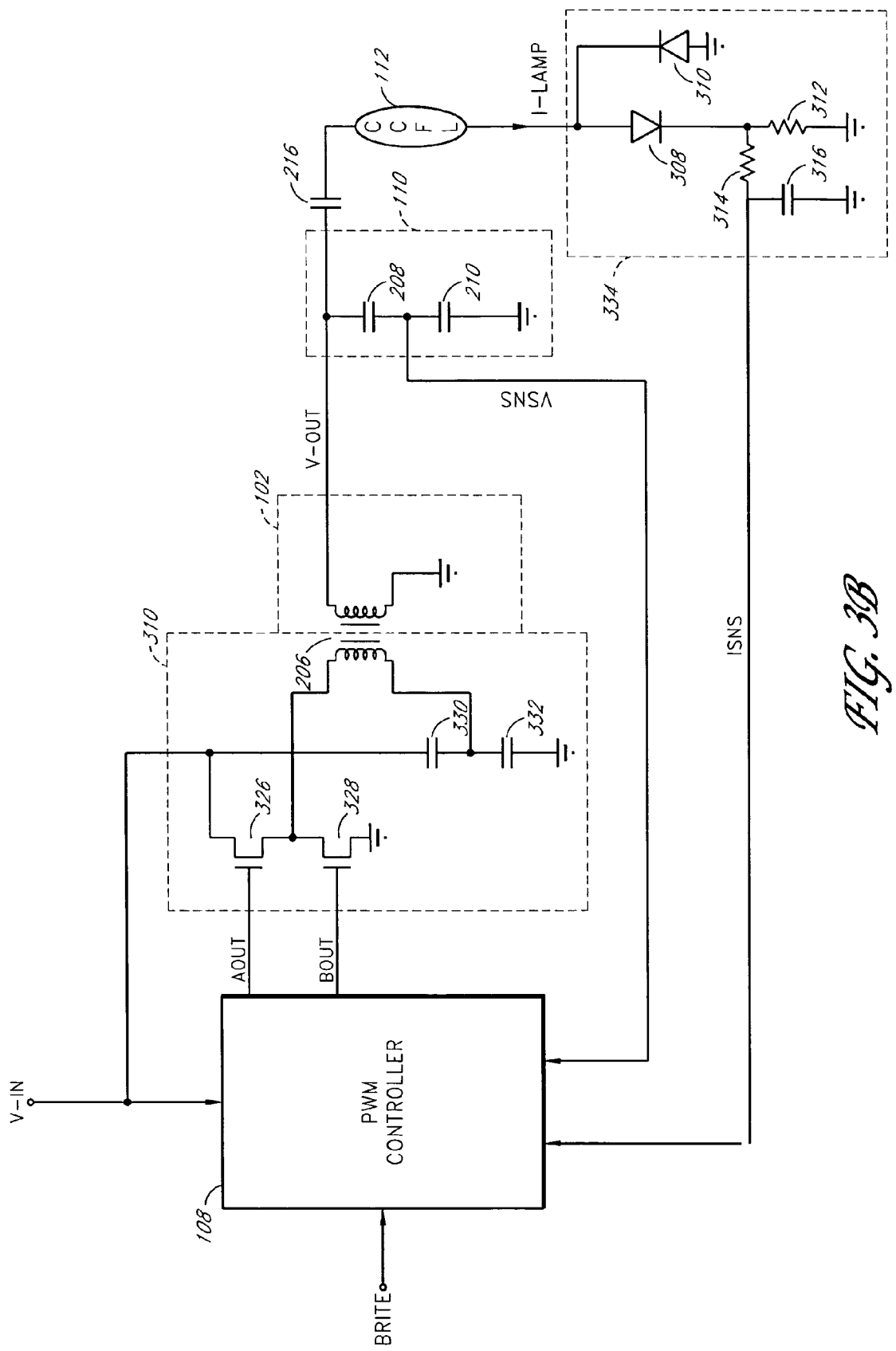
FIG. 3B illustrates one embodiment of an inverter with a half-bridge switching network and a third configuration for sensing a load current.

FIG. 3B illustrates one embodiment of an inverter with a half-bridge switching network and a third configuration for sensing a load current. For example, a primary network 310 includes two switching transistors 326, 328 in a half-bridge configuration, a primary winding of a transformer 206 and optional capacitors 330, 332. In one embodiment, the switching transistors 326, 328 are N-FETs coupled in series between a supply voltage and ground with a common node coupled to one end of the primary winding of the transformer 206. The optional capacitors 330, 332 are also connected in series between the supply voltage and ground with a common node coupled to another end of the primary winding of the transformer 206. The switching transistors 326, 328 are controlled by respective PWM driving signals (AOUT, BOUT) to alternately conduct and generate an AC signal on the primary winding. The PWM driving signals are provided by the PWM controller 108 to respective gate terminals of the switching transistors 326, 328. FIG. 3B shows an alternate half-wave rectifier 334 coupled in series with the CCFL 112 to sense the lamp current The different primary networks depicted in FIGS. 2, 3A and 3B are interchangeable and other configurations to couple the supply voltage and the switching transistors to the primary winding of the transformer 206 may also be used to produce the AC signal on the primary winding. In one embodiment, the PWM controller 108 is compatible with a variety of different configurations. For example, the PWM controller 108 outputs a set of PWM driving signals that can be used to control half-bridge switching networks or full-bridge switching networks. The different current feedback circuits shown in FIGS. 2, 3A, 3B are also interchangeable and other configurations (e.g., a full-wave rectifier) can be used to sense the lamp current.

Figure 4A:
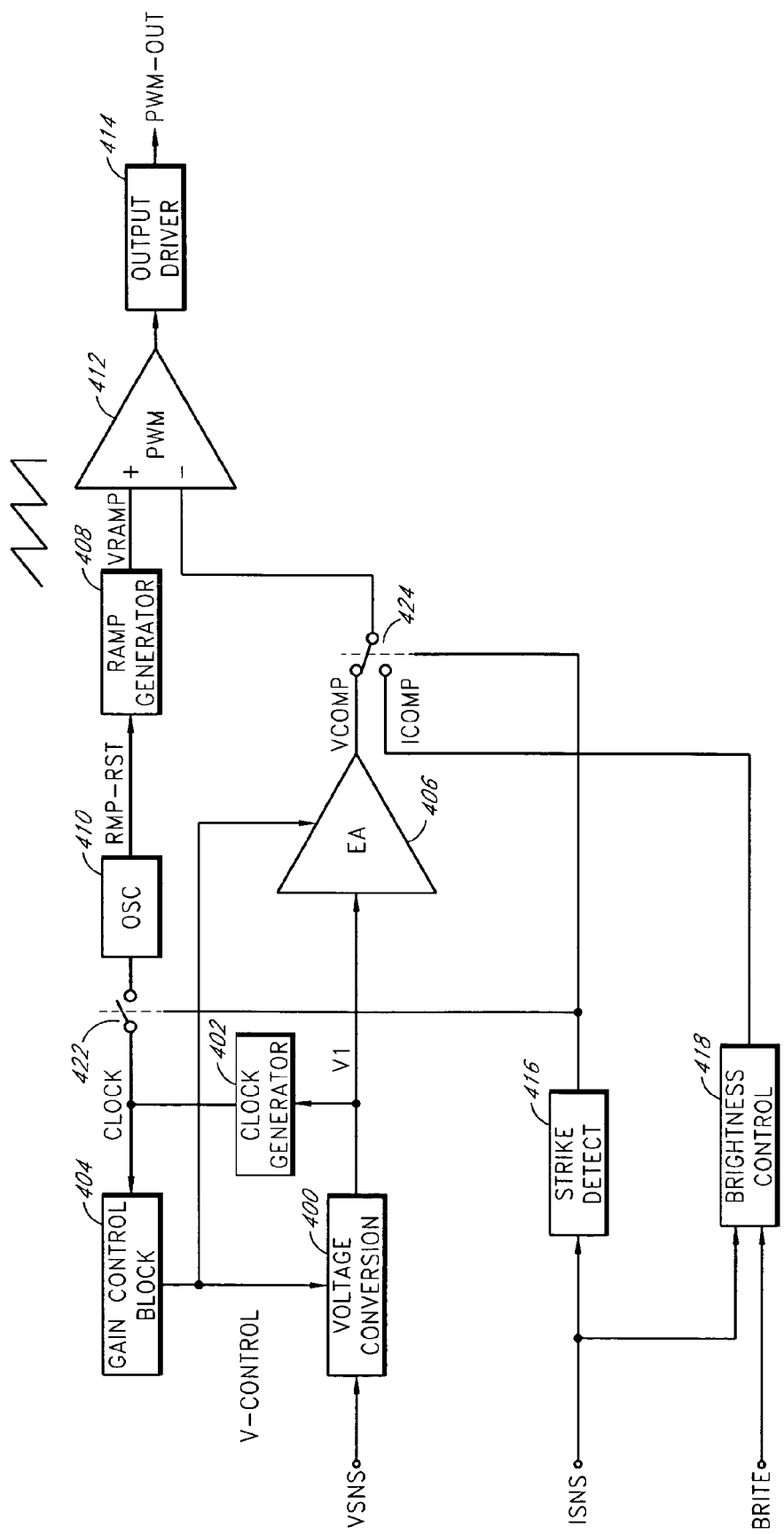
FIG. 4A is a block diagram of one embodiment of a controller that provides variable gain control in a voltage regulation loop.

FIG. 4A is a block diagram of one embodiment of a controller that provides variable gain control in a voltage regulation loop. The voltage regulation loop includes a voltage conversion circuit 400 and an error amplifier 406. The voltage conversion circuit 400 receives a voltage feedback signal (VSNS) indicative of an output voltage of an inverter and generates an internal voltage (V1) that is provided to the error amplifier 406. The error amplifier 406 generates a voltage compensation signal (VCOMP) that is used to regulate the output voltage of the inverter. For example, a PWM circuit 412 compares the voltage compensation signal to a ramp signal (VRAMP) and provides a driving control signal to an output driver 414 to control pulse widths (or duty cycles) of PWM driving signals (PWM-OUT). The controller provides the PWM driving signals to a switching network in the inverter to generate the output voltage.

In one embodiment, a clock generator 402 is coupled to the output of the voltage conversion circuit to generate a clock signal (CLOCK). The clock signal is provided to a gain control block 404, and the gain control block 404 outputs a gain control signal (V-CONTROL) to adjust a gain of the voltage regulation loop in response to the clock signal. For example, the gain of the voltage regulation loop is initially set to a first level (or starting level) that corresponds to a relatively lower regulated output voltage for the inverter. In response to the clock signal, the gain of the voltage regulation loop gradually progresses (e.g., decreases) from the first level to a second level (or final level) that corresponds to a relatively higher regulated output voltage for the inverter. By gradually adjusting the gain of the voltage regulation loop, the output voltage of the inverter starts regulating at a lower voltage level and smoothly increases to a higher regulated voltage level without overshoot.

Although the clock signal shown in FIG. 4A is derived from the voltage feedback signal, other types of signals or programmed clocks can be used by the gain control block to generate a gain control signal with a desired profile. The gain control signal can be used to adjust one or more circuit parameters in the voltage conversion circuit 400 to vary the gain of the voltage regulation loop. Alternately or in combination, the gain control signal can be used to adjust one or more circuit parameters in the error amplifier 406 to vary the gain of the voltage regulation loop.

In one embodiment, the voltage conversion circuit 400 is designed for an upper gain limit of 1.5 and a lower gain limit of 0.75. Thus, the level of the voltage feedback signal using the upper gain limit is half of the level of the voltage feedback signal using the lower gain limit to generate approximately the same internal voltage level. That is, regulation of the inverter output voltage can start when the inverter output voltage reaches half of its final (or desired) regulated level. For example, the voltage conversion circuit 400 uses the upper gain limit at start-up or as a default with the gain decreasing from the upper gain limit to the lower gain limit with every selected clock period. As the gain decreases, the inverter output voltage increases. Thus, the inverter output voltage advantageously starts regulation at a relatively lower level and increases smoothly to the desired level without overshoot. FIG. 8A illustrates an inverter output voltage waveform with overshoot and FIG. 8B illustrates an inverter output voltage waveform generated using a variable gain voltage regulation loop to avoid overshoot.

A resonant frequency tracking loop helps the controller adjust the frequency of the inverter output voltage closer to a resonant frequency in order to generate a sufficient output voltage to strike an unlit lamp. In one embodiment, the clock signal derived from the voltage feedback signal is used in the resonant frequency tracking loop to track the frequency of the output voltage. For example, the clock signal generated by the clock generator 402 is provided to an oscillator 410 during a strike mode of controller. The oscillator 410 outputs a ramp reset signal (RMP-RST) to a ramp generator 408. The ramp generator 408 generates the ramp signal (VRAMP) for the PWM circuit 412 with the frequency of the ramp signal determined by the ramp reset signal.

In one embodiment, the inverter drives a load comprising at least one lamp and the controller includes a strike detect circuit 416 and a brightness control circuit 418. The strike detect circuit 416 monitors a current feedback signal (ISNS) indicative of a lamp current to determine when the lamp strikes (e.g., when the current feedback signal is above a predetermined threshold). The brightness control circuit 418 receives the current feedback signal and at least one brightness control signal (BRITE) to generate a current compensation signal (ICOMP) to control the lamp's brightness by varying the duty cycle of the PWM driving signals after striking.

In the embodiment shown in FIG. 4A, the controller includes a first switch 422 and a second switch 424 controlled by an output of the strike detect circuit 416. The first switch 422 is coupled between an output of the clock generator 402 and an input to the oscillator 410 such that the clock signal from the clock generator 402 can control the frequency of the oscillator 410 during the strike mode. After the lamp strikes, the clock signal is disconnected from the oscillator 410 and the oscillator runs at a predetermined fixed frequency. The second switch 424 is coupled to an inverting input of the PWM circuit 412 such that the voltage compensation signal from the error amplifier 406 is selectively provided to the inverting input of the PWM circuit 412 to regulate the open lamp output voltage during the strike mode and the current compensation signal from the brightness control circuit 418 is selectively provided to the inverting input of the PWM circuit 412 to regulate lamp brightness during the run mode.

Figure 4B:
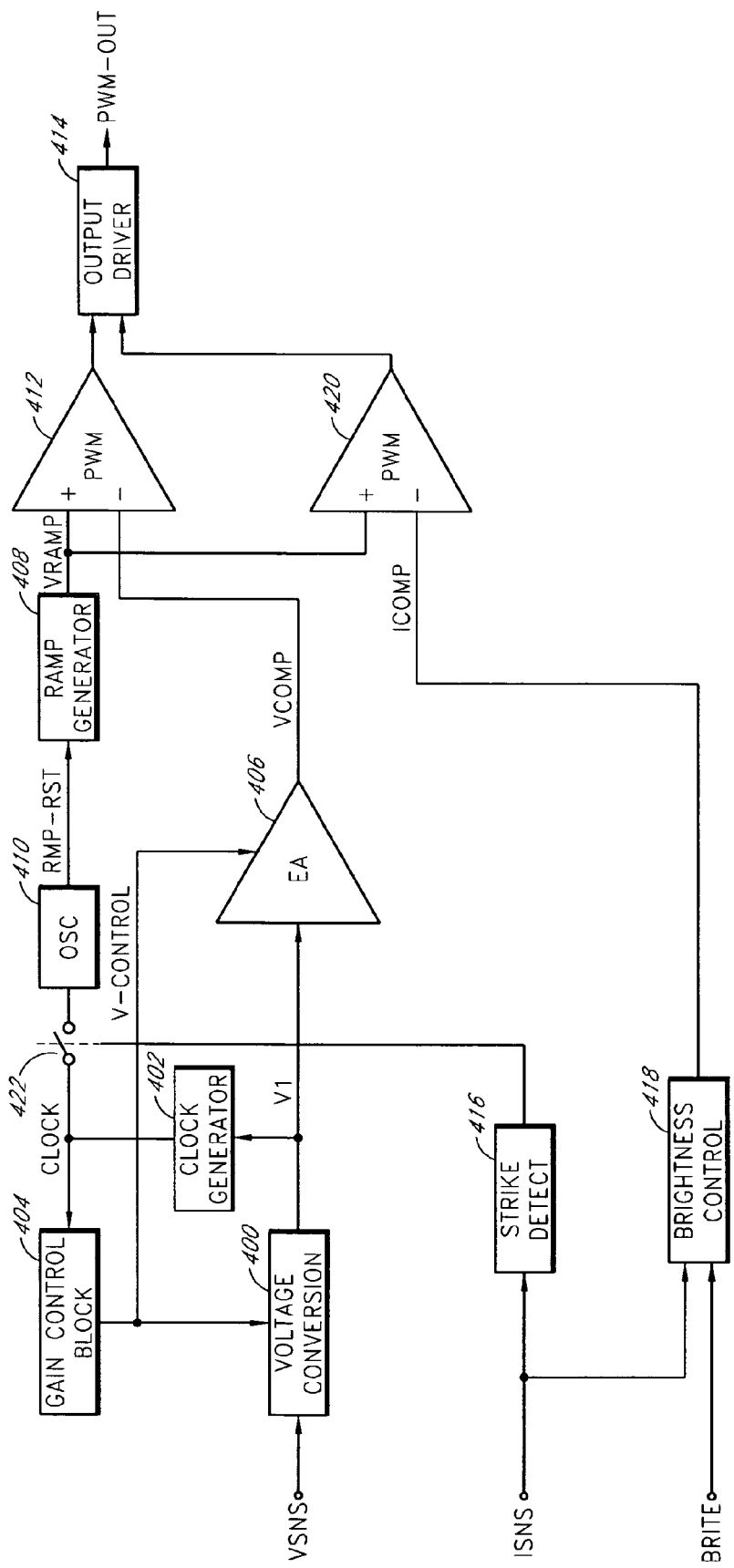
FIG. 4B is a block diagram of another embodiment of a controller that provides variable gain control in a voltage regulation loop.

In the alternate embodiment shown in FIG. 4B, the controller includes the first switch 422 but not the second switch 424. Instead, the controller includes an additional PWM circuit 420. The original PWM circuit 412 compares the voltage compensation signal from the error amplifier 406 with the ramp signal to generate a first driving control signal. The additional PWM circuit 412 compares the current compensation signal from the brightness control circuit 418 with the ramp signal to generate a second driving control signal. Both of the driving control signals are provided to the output driver 414. In one embodiment, the relative amplitude of the driving control signals determines which driving control signal dominates and controls the duty cycle of the PWM driving signals.

Figure 5A:
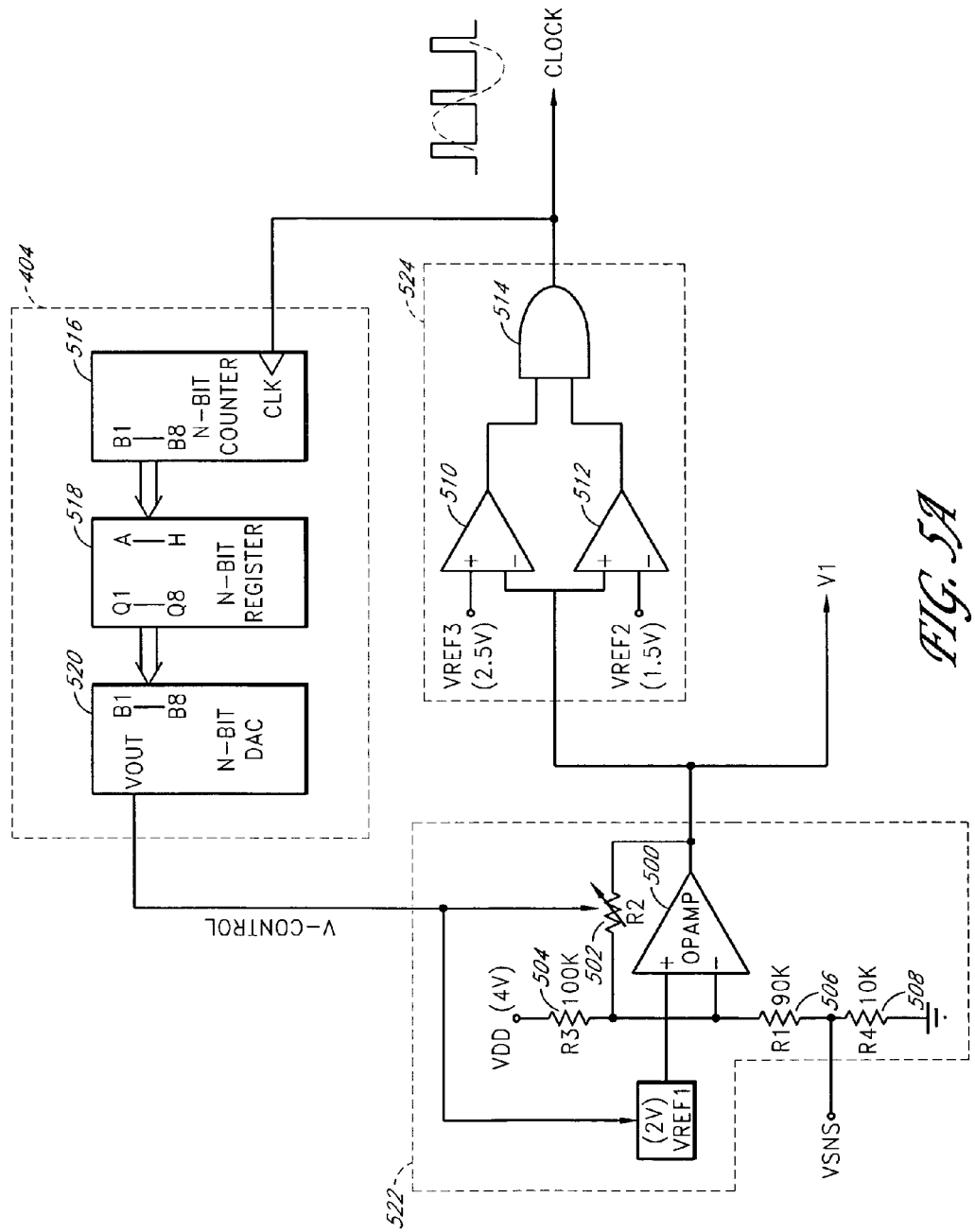
FIGS. 5A and 5B illustrate schematic diagrams of various circuits in a voltage regulation loop according to one embodiment of the invention.
Figure 5B:
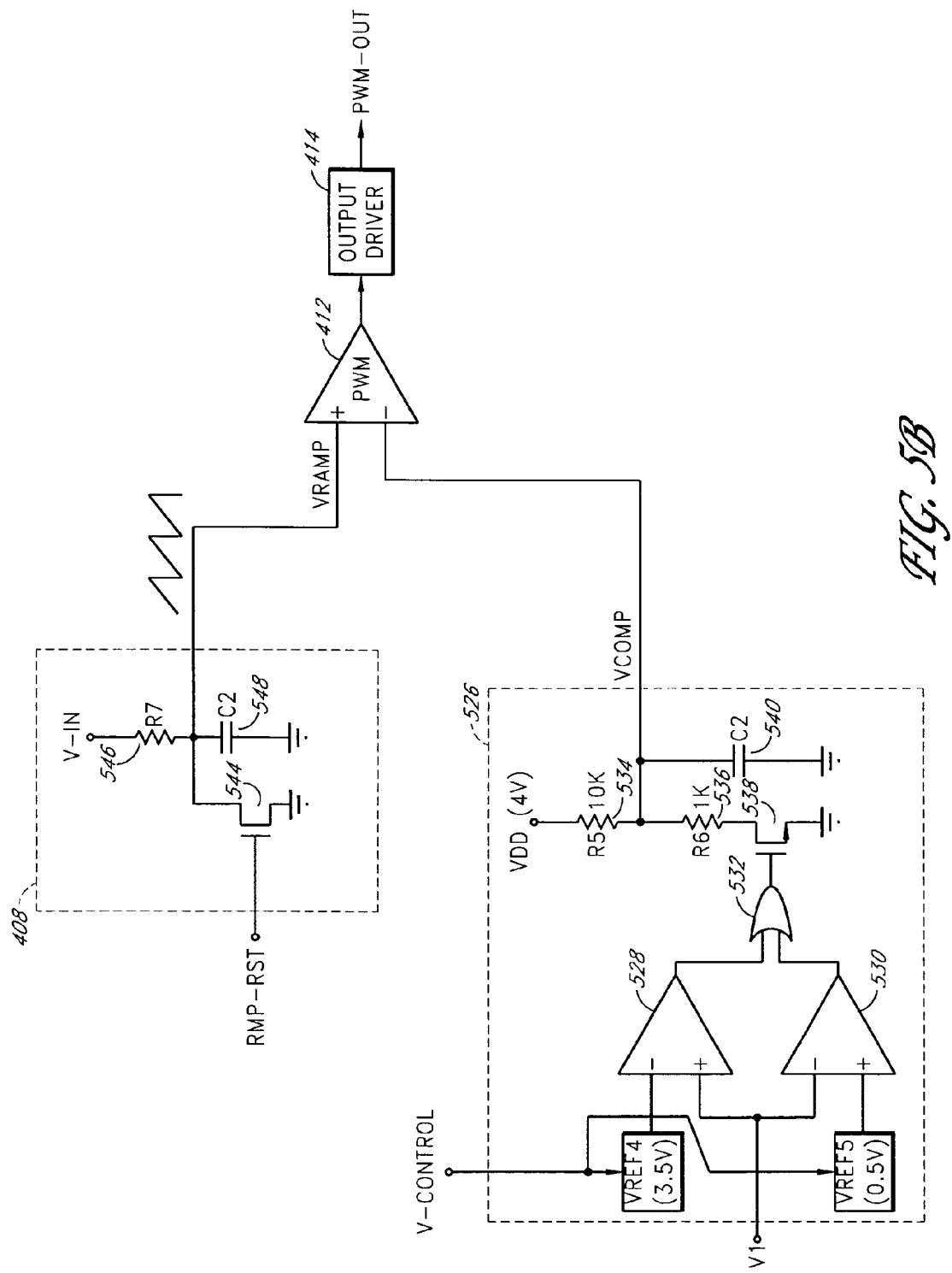

FIGS. 5A and 5B illustrate schematic diagrams of various circuits in a voltage regulation loop according to one embodiment of the invention. For example, a detailed schematic diagram of a variable gain amplifier 522 is shown in FIG. 5A. The variable gain amplifier 522 corresponds to the voltage conversion circuit 400 shown in FIGS. 4A and 4B. The variable gain amplifier 522 comprises an operational amplifier 500, a first resistor (R1) 506 coupled between an input terminal of the controller and an inverting input of the operational amplifier 500, a feedback resistor (R2) 502 coupled between the inverting input and an output of the operational amplifier 500, a third resistor (R3) 504 coupled between the inverting input of the operational amplifier 500 and VDD (e.g., a 4V supply voltage), and a fourth resistor (R4) 508 coupled between the input terminal of the controller and ground. A first reference voltage (VREF1 or first threshold voltage) is provided to a non-inverting input of the operational amplifier 500. The voltage feedback signal (VSNS) is provided to the input terminal of the controller. The output of the operational amplifier corresponds to the internal voltage (V1) generated by the voltage conversion circuit 400 and has the following relationship:

$$V1=(1+R2/R1+R2/R3)VREF3-R2/R1*VSNS-R2/R3*VDD.$$

When the voltage feedback signal is approximately zero, the internal voltage is approximately $(1+R2/R1+R2/R3)$ VREF3−R2/R3*VDD. Thus, the conversion range of the variable gain amplifier 522 depends on VREF3 and VDD in addition to the operating range of the operational amplifier 500. The gain of the variable gain amplifier 522 can be adjusted by varying values for one or more of the resistors (e.g., R1 or R2) separately or together. At a higher (or maximum) gain, an internal voltage associated with a lower voltage feedback signal can have the same amplitude as an internal voltage associated with a higher voltage feedback signal at a lower (or minimum) gain. The gain of the variable gain amplifier 522 can also be adjusted by varying the first reference voltage. For example, the effective gain decreases when the first reference voltage increases. In one embodiment, the first reference voltage is initially set to a lower voltage (e.g., half of its final value) and gradually increases to a higher voltage (e.g., 2V) such that the output voltage of the inverter starts regulation at a relatively lower level and increases smoothly to a relatively higher level without overshoot.

A detailed schematic diagram of a clock generator 524 is also shown in FIG. 5A. In one embodiment, the clock generator 524 is coupled to an output of the voltage conversion circuit 400 (e.g., the variable gain amplifier 522) and generates a clock signal based on the voltage feedback signal (e.g., using the internal voltage derived from the voltage feedback signal). A window comparator comprising two comparators 510, 512 compares the internal voltage with respective reference voltages (VREF3, VREF2). When the internal voltage is lower than VREF3 and higher than VREF2, both comparators 510, 512 output logic high to an AND-gate 514 and the clock signal at an output of the AND-gate is high. When the internal voltage is higher than VREF3 or lower than VREF2, at least one of the comparators 510, 512 outputs a logic low and the clock signal is low.

FIG. 5A further shows a detailed block diagram of one embodiment of the gain control block 404 that receives the clock signal to generate a gain control signal (V-CONTROL) for varying the gain of the voltage regulation loop. The gain control block 404 includes an N-bit counter 516, an optional N-bit register 518 and an N-bit DAC 520. The clock signal is coupled to an input (e.g., a clock input) of the counter 516. A portion or all of the counter outputs can be used to generate the gain control signal. For example, all of the outputs (B1 through B8) of an 8-bit counter or the upper five bits (B4 though B8) can be provided to the optional register 518. The optional register 518 can be a buffer or any other storage logic that is coupled to the DAC 520. The DAC 520 outputs an analog voltage or current that is proportional to a digital input word. The output of the DAC 520 is the gain control signal that can vary an impedance or a reference voltage in the voltage conversion circuit 400 or the error amplifier 406 to adjust the gain of the voltage regulation loop.

In one embodiment, the components in the gain control block 404 reset when the controller is enabled or powered at start-up to configure the voltage regulation loop for a first level of gain (e.g., a maximum gain) associated with a relatively lower inverter output voltage. Thus, regulation of the inverter output voltage is activated at a relatively lower level. In one embodiment, the regulation level increases at a predetermined rate (or with each cycle of the clock signal or other programmed clocks) until the gain of the voltage regulation loop reaches a second level of gain (e.g., a minimum gain) associated with a desired inverter output voltage for steady-state operations (e.g., a maximum output voltage for striking a lamp). In one embodiment, the counter 516 resets to a minimum value (or defaults to a zero output) and counts up with each clock signal cycle to decrease the gain of the voltage regulation loop. When the counter 516 reaches a maximum value, the counter stops or is disabled for receiving further clock signals to fix the gain of the voltage regulation loop. Alternately, the counter 516 can reset (or default) to a maximum value and count down with each clock signal cycle to accomplish the same function.

A detailed schematic diagram of one embodiment of an error amplifier 526 is illustrated in FIG. 5B. The error amplifier 526 includes a window comparator comprising two comparators 528, 530 that compare the internal voltage with respective reference voltages (VREF4, VREF5). The first comparator 528 senses an upper limit (VREF4) and the second comparator 530 senses a lower limit (VREF5) of the internal voltage. When the internal voltage is lower than the upper limit and higher than the lower limit, both of the comparators 528, 530 output logic low to an OR-gate 532. An output of the OR-gate 532 controls a semiconductor switch (e.g., N-FET) 538. The semiconductor switch 538 opens (or is off) when the output of the OR-gate is logic low and allows a capacitor (C1) 540 to charge to a supply voltage (VDD) through a resistor (R5) 534. When the internal voltage is higher than the upper limit or lower than the lower limit, one of the comparators 528, 530 outputs logic high and the semiconductor switch 538 closes to discharge the capacitor 540. The voltage across the capacitor 540 is an output of the error amplifier 526 and corresponds to the voltage compensation signal.

In one embodiment, the gain of the voltage regulation loop can be varied by varying the levels of the reference voltages (VREF4, VREF5). For example, the reference voltage corresponding to the upper limit of the internal voltage is initially set lower while the reference voltage corresponding the lower limit of the internal voltage is initially set higher to effectively increase the gain of the voltage regulation loop. The gain control signal can gradually increase the upper limit and decrease the lower limit to effective decrease the gain of the voltage regulation loop and allow the inverter output voltage to rise to a final regulated level in a controlled manner without overshoot.

FIG. 5B also illustrates one embodiment of a ramp generator 408. The ramp generator 408 comprises a reset switch 544, a charging capacitor (C2) 548 and a resistor (R7) 546. The charging capacitor 548 and the resistor 546 are coupled in series between the supply voltage (V-IN) and ground. The reset switch 544 is coupled in parallel with the charging capacitor 548 and receives the ramp reset signal (RMP-RST) to periodically discharge the charging capacitor 548. The voltage across the charging capacitor 548 corresponds to the ramp signal that is provided to the PWM circuit 412 and the additional PWM circuit 420.

Figure 6:
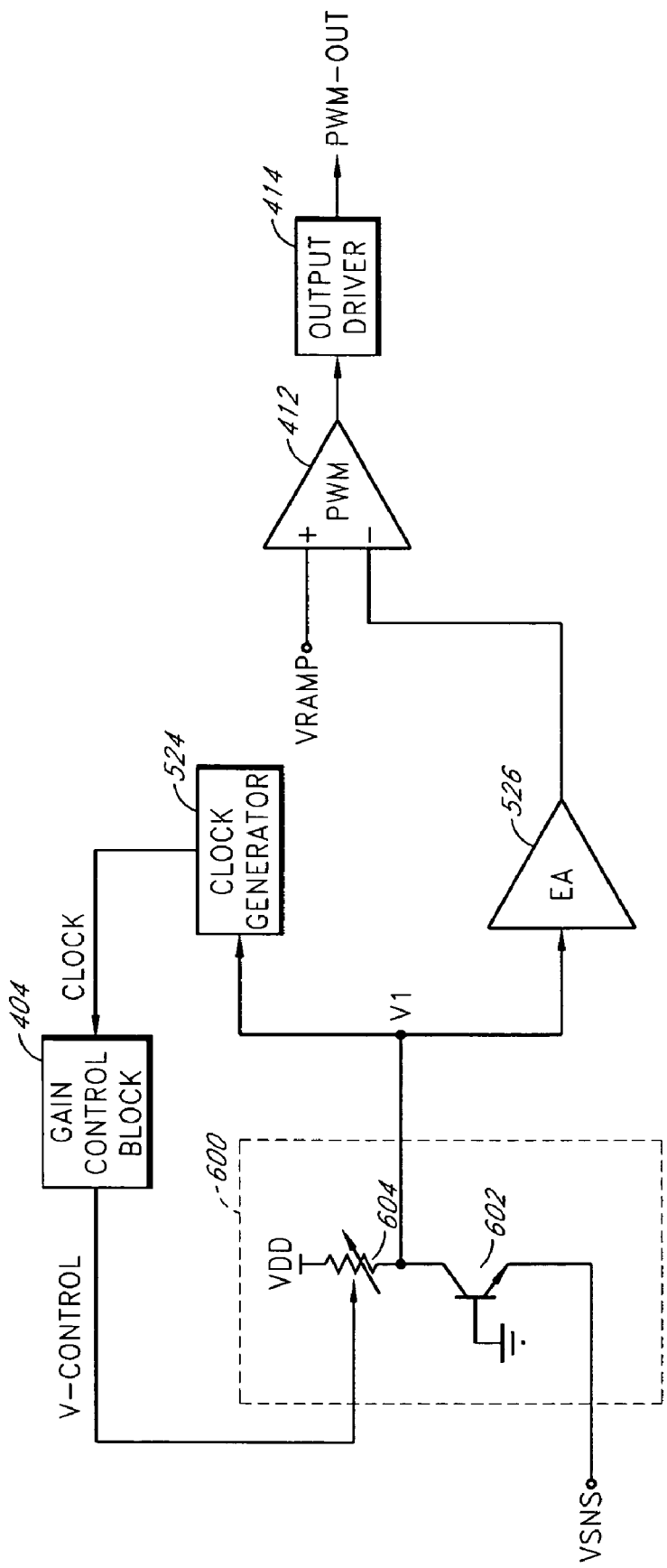
FIG. 6 illustrates a voltage regulation loop with a feedback signal provided to a level-shift circuit.

FIG. 6 illustrates an alternate embodiment of a voltage regulation loop with a voltage feedback signal (VSNS) provided to a level-shift circuit 600. The level-shift circuit 600 corresponds to the voltage conversion circuit 400 and comprises a bipolar junction transistor (BJT) 602 and an output resistor 604. In one embodiment, the BJT 602 is an NPN BJT with an emitter terminal coupled to the voltage feedback signal, a base terminal coupled to ground and a collector terminal coupled to a supply voltage (VDD) through the output resistor 604. The voltage at the collector terminal corresponds to the internal voltage (V1) that is provided to the error amplifier 526 and the clock generator 524 for further processing. In one embodiment, the output resistor 604 is variable to adjust the gain of the level shift circuit, thereby adjusting the gain of the voltage regulation loop. For example, the gain control signal (V-CONTROL) from the gain control block 404 can be used to vary the value of the output resistor 604.

Figure 7:
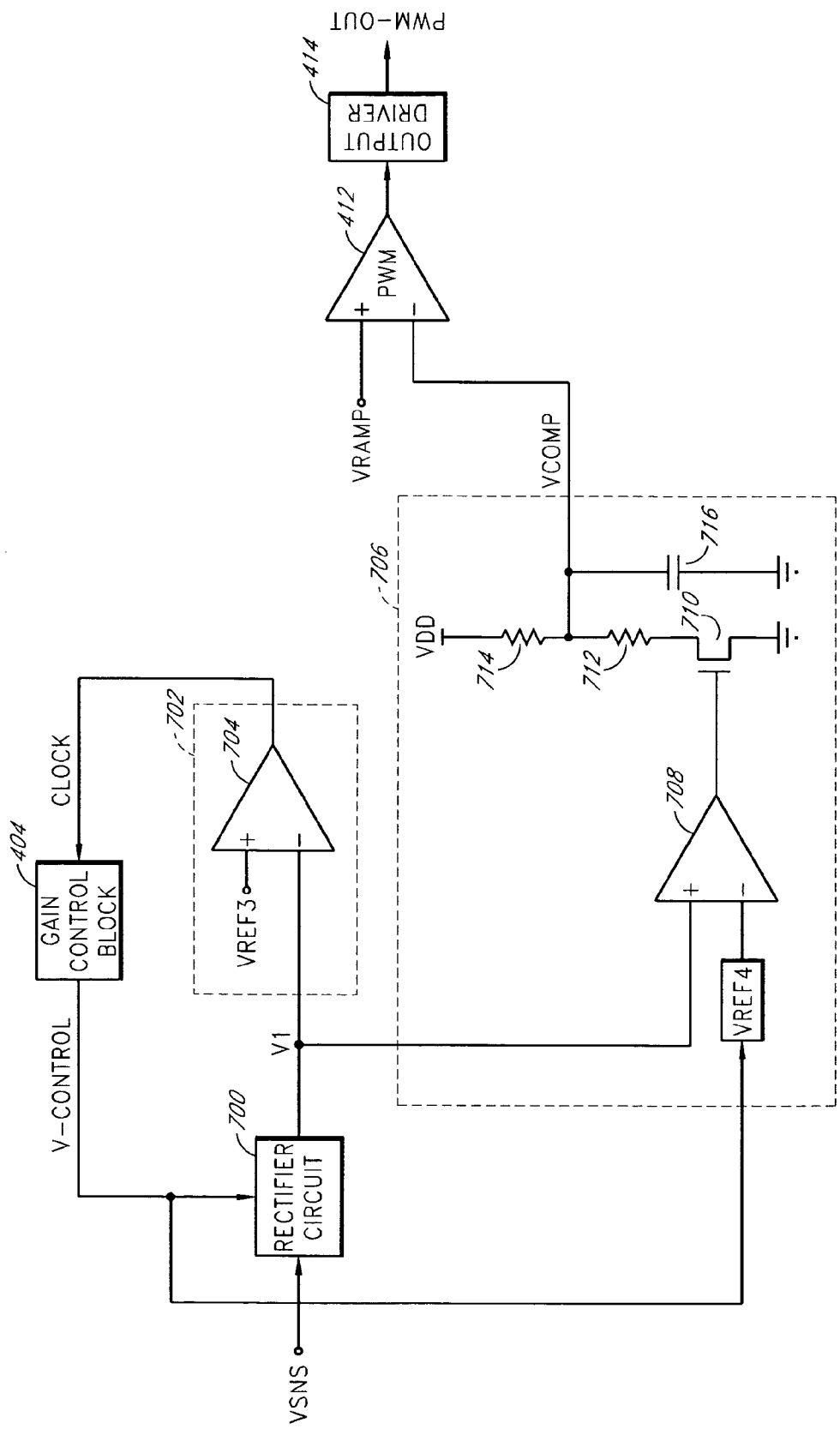
FIG. 7 illustrates a voltage regulation loop with a feedback signal provided to a rectifier circuit.

FIG. 7 illustrates another embodiment of a voltage regulation loop with a voltage feedback signal provided to a rectifier circuit 700. For example, the rectifier circuit 700 provides half-wave or full-wave rectification of the voltage feedback signal to generate an internal voltage (V1). In one embodiment, the rectifier circuit 700 includes at least one circuit element (e.g., an impedance or a reference voltage) that varies in response to the gain control signal (V-CONTROL) provided by the gain control block 404 to adjust a gain of the voltage regulation loop. In FIG. 7, one embodiment of a clock generator 702 comprising a comparator 704 generates a clock signal for the gain control block 404. In particular, the internal voltage is provided to one input of the comparator 704 and a reference voltage (VREF3) is provided to another input of the comparator 704 to generate the clock signal at an output of the comparator 704.

In FIG. 7, an error amplifier 706 similar to the error amplifier 526 shown in FIG. 5B is used to generate the voltage compensation signal (VCOMP) except the error amplifier 706 uses one comparator 708 instead of a window comparator to process the internal voltage. For example, the internal voltage from the rectifier circuit 700 is provided to one input of the comparator 708 and a reference voltage (VREF4) is provided to another input of the comparator. An output of the comparator 708 controls a semiconductor switch 710. In one embodiment, the semiconductor switch 710 is off to allow a capacitor 716 to charge to a supply voltage through a resistor 714 when the internal voltage is less than the reference voltage. The semiconductor switch 710 turns on to discharge the capacitor 716 through a resistor 712 when the internal voltage is greater than the reference voltage. The voltage across the capacitor 716 is an output of the error amplifier 706 and corresponds to the voltage compensation signal.

Various embodiments have been described above. Although described with reference to these specific embodiments, the descriptions are intended to be illustrative and are not intended to be limiting. Various modifications and applications may occur to those skilled in the art without departing from the true spirit and scope of the invention as defined by the appended claims.

What is claimed is:

1. A controller for an inverter, the controller comprising:
   an input terminal configured to receive a feedback signal indicative of an output voltage of the inverter;
   a voltage regulation loop comprising a voltage conversion circuit and an error amplifier, wherein the feedback signal is provided to an input of the voltage conversion circuit and an output of the voltage conversion circuit is provided to an input of the error amplifier;
   a pulse width modulator configured to generate a driving signal to control the output voltage of the inverter based on an output of the error amplifier; and
   a gain control block that varies at least one circuit parameter in the voltage conversion circuit or in the error amplifier in response to a clock signal to adjust a gain of the voltage regulation loop independently of frequency changes for the driving signal.

2. The controller of claim 1, wherein the gain of the voltage regulation loop is set to an initial level associated with a relatively lower regulated output voltage at start-up or after reset and decreases to a final level associated with a relatively higher regulated output voltage after a predetermined number of cycles in the clock signal.

3. The controller of claim 2, wherein the inverter drives a fluorescent lamp and the relatively higher regulated output voltage corresponds to an open lamp output voltage that is sufficient to strike an unlit fluorescent lamp.

4. The controller of claim 1, wherein the voltage conversion circuit comprises an operational amplifier with the feedback signal coupled to an inverting input terminal, a threshold voltage coupled to a non-inverting input terminal, and a feedback impedance coupled between the inverting input terminal and an output terminal.

5. The controller of claim 4, wherein at least one of the threshold voltage and the feedback impedance is variable.

6. The controller of claim 1, wherein the voltage conversion circuit comprises a level-shift circuit with a variable impedance.

7. The controller of claim 1, wherein the voltage conversion circuit comprises a rectifier circuit that provides half-wave rectification or full-wave rectification of the feedback signal.

8. The controller of claim 1, wherein the error amplifier comprises at least one comparator that compares the output of the voltage conversion circuit to a variable threshold voltage.

9. The controller of claim 1, wherein the gain control block comprises a counter that counts with each cycle of the clock signal and a digital-to-analog converter that generates a control signal to adjust the gain of the voltage regulation loop based on an output of the counter.

10. The controller of claim 9, wherein the gain control block further comprises a register coupled between the counter and the digital-to-analog converter.

11. The controller of claim 1, further comprising a clock generator coupled to the output of the voltage conversion circuit.

12. The controller of claim 11, wherein the clock generator comprises at least one comparator that compares the output of the voltage conversion circuit to a threshold voltage to generate the clock signal.

13. A method to regulate an output voltage of an inverter, the method comprising:
   providing a feedback signal indicative of the output voltage of the inverter to a voltage regulation loop with variable gain control, wherein the voltage regulation loop comprises a voltage conversion circuit and an error amplifier;
   generating a pulse width modulated driving signal based on an output of the error amplifier to control the output voltage of the inverter; and
   adjusting the voltage regulation loop gain independently of the pulse width modulated driving signal's frequency to start output voltage regulation at a relatively lower voltage level and to increase the regulated output voltage from the relatively lower voltage level to a relatively higher voltage level in response to a clock signal, wherein the clock signal is based on the feedback signal.

14. The method of claim 13, wherein the voltage regulation loop gain is adjusted by varying a threshold voltage in the voltage conversion circuit.

15. The method of claim 13, wherein the voltage regulation loop gain is adjusted by varying an impedance in the voltage conversion circuit.

16. The method of claim 13, wherein the clock signal is generated from an output of the voltage conversion circuit.

17. The method of claim 13, wherein the voltage regulation loop gain is adjusted by varying one or more threshold voltages in the error amplifier.

18. The method of claim 13, wherein the inverter drives a cold cathode fluorescent lamp and the relatively higher voltage level of the regulated output voltage corresponds to a regulated open lamp voltage used to strike the cold cathode fluorescent lamp.

19. An inverter controller comprising:
   means for receiving a feedback signal indicative of an output voltage of an inverter;
   means for processing the feedback signal to generate a pulse width modulated driving signal to regulate the output voltage of the inverter to a desired regulation level; and
   means for varying the desired regulation level based on a clock signal and independently of a frequency of the pulse width modulated driving signal.

20. The inverter controller of claim 19, wherein the clock signal is based on the feedback signal.

* * * * *